US011899913B2

(12) United States Patent
Li et al.

(10) Patent No.: US 11,899,913 B2
(45) Date of Patent: Feb. 13, 2024

(54) INFORMATION REPLY METHOD, APPARATUS, ELECTRONIC DEVICE, READABLE STORAGE MEDIUM AND PROGRAM PRODUCT

(71) Applicant: BEIJING BYTEDANCE NETWORK TECHNOLOGY CO., LTD., Beijing (CN)

(72) Inventors: Xinyi Li, Beijing (CN); Na Sun, Beijing (CN); Yujie Li, Beijing (CN); Ye Lin, Beijing (CN); Siqi Tan, Beijing (CN)

(73) Assignee: BEIJING BYTEDANCE NETWORK TECHNOLOGY CO., LTD.

( * ) Notice: Subject to any disclaimer, the term of this patent is extended or adjusted under 35 U.S.C. 154(b) by 0 days.

(21) Appl. No.: 17/730,533

(22) Filed: Apr. 27, 2022

(65) Prior Publication Data

US 2023/0066583 A1 Mar. 2, 2023

(30) Foreign Application Priority Data

Sep. 2, 2021 (CN) .......................... 202111026992.1

(51) Int. Cl.
*G06F 3/0484* (2022.01)
*H04L 51/216* (2022.01)
*H04L 51/224* (2022.01)
*G06Q 50/00* (2012.01)

(52) U.S. Cl.
CPC .......... *G06F 3/0484* (2013.01); *H04L 51/216* (2022.05); *H04L 51/224* (2022.05); *G06Q 50/01* (2013.01)

(58) Field of Classification Search
CPC .... G06F 3/0484; H04L 51/216; H04L 51/224
See application file for complete search history.

(56) References Cited

U.S. PATENT DOCUMENTS

| 10,984,183 | B1 * | 4/2021 | Clediere | ............... G06F 3/0482 |
| 11,026,064 | B1 * | 6/2021 | Paul | ........................ H04W 4/21 |
| 2012/0221937 | A1 * | 8/2012 | Patterson | .............. G06F 3/0482 |
| | | | | 715/752 |
| 2014/0274381 | A1 * | 9/2014 | Kojo | ........................ A63F 13/87 |
| | | | | 463/31 |
| 2017/0192651 | A1 * | 7/2017 | Yang | ................... G06F 3/04845 |

(Continued)

FOREIGN PATENT DOCUMENTS

| CN | 109348299 A | 2/2019 |
| CN | 111638832 A | 9/2020 |

(Continued)

*Primary Examiner* — Beau D Spratt

(57) ABSTRACT

The invention relates to an information reply method, apparatus, electronic device, readable storage medium and program product. The method includes: displaying an entry label for entering an information exhibition page in an authoring page for a first multimedia content, and displaying the information exhibition page in response to a trigger action for the entry label, wherein the information exhibition page comprises one or more pieces of information associated with a second multimedia content; in response to a trigger action for a target information, displaying a sticker corresponding to the target information in the authoring page for the first multimedia content, and replying the target information through the first multimedia content.

17 Claims, 12 Drawing Sheets

(56) References Cited

U.S. PATENT DOCUMENTS

| | | | |
|---|---|---|---|
| 2018/0255356 A1 | 9/2018 | Zhao | |
| 2019/0288972 A1* | 9/2019 | Morrison | ................ H04L 51/52 |
| 2019/0324612 A1 | 10/2019 | Du et al. | |
| 2020/0027172 A1* | 1/2020 | Benfield | .............. H05K 999/99 |
| 2021/0037195 A1* | 2/2021 | Cutler | ................ H04N 5/23219 |
| 2021/0042724 A1* | 2/2021 | Rathod | ................ G07G 1/0054 |
| 2021/0334325 A1 | 10/2021 | Ai et al. | |
| 2022/0101415 A1* | 3/2022 | Devoy, III | ........... G06Q 10/087 |

FOREIGN PATENT DOCUMENTS

| | | |
|---|---|---|
| CN | 112272302 A | 1/2021 |
| CN | 113065081 A | 7/2021 |

\* cited by examiner

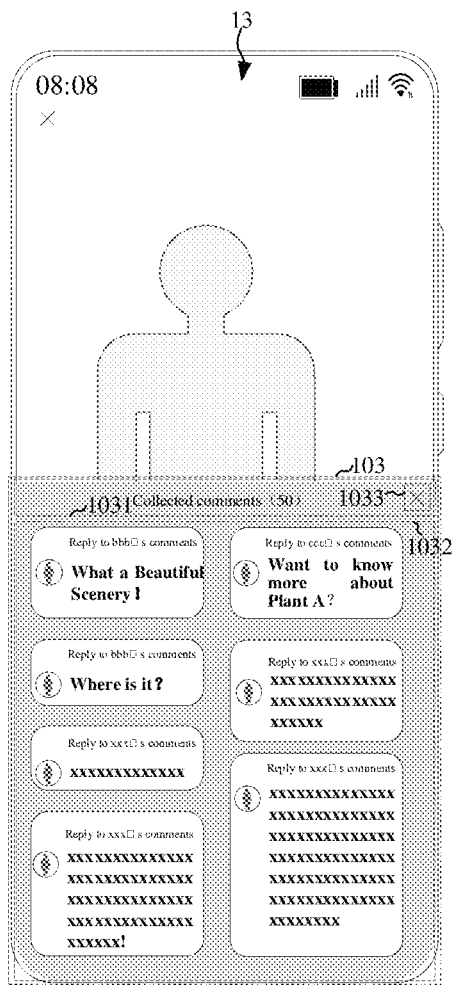
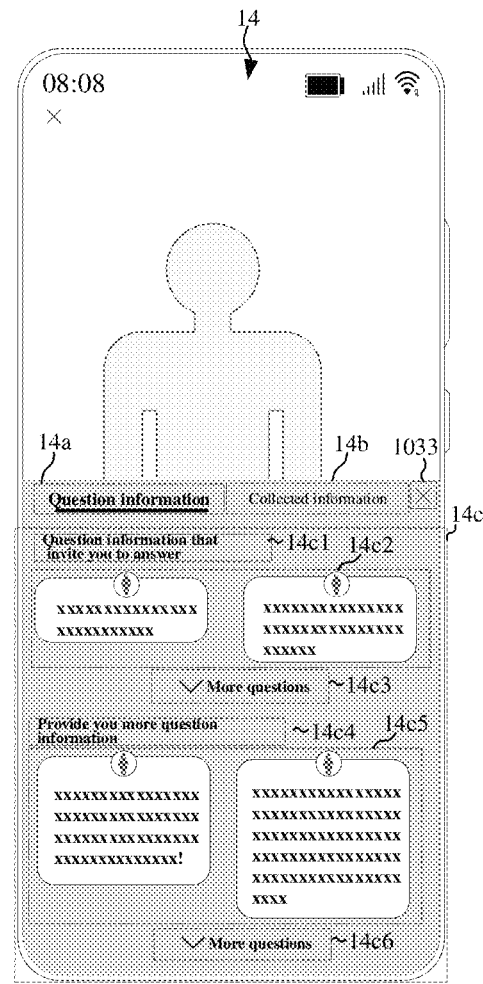
Fig. 1C                    Fig. 1D

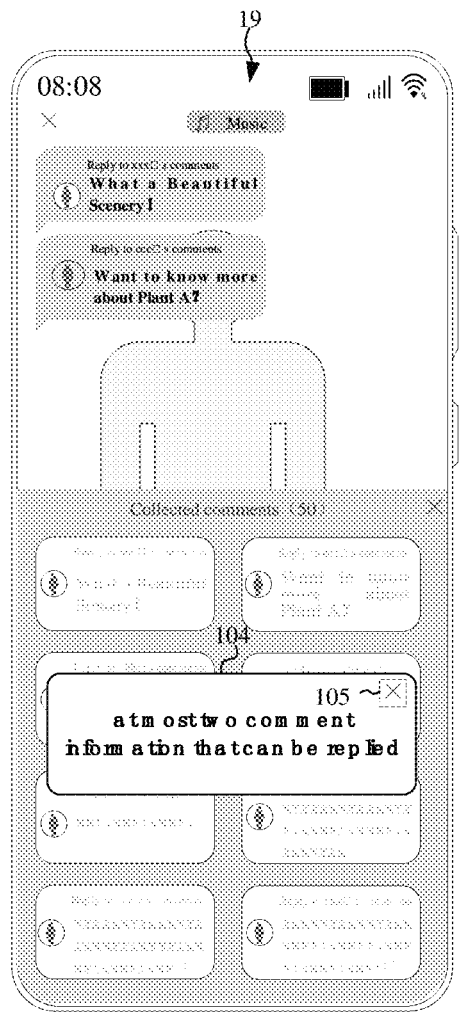 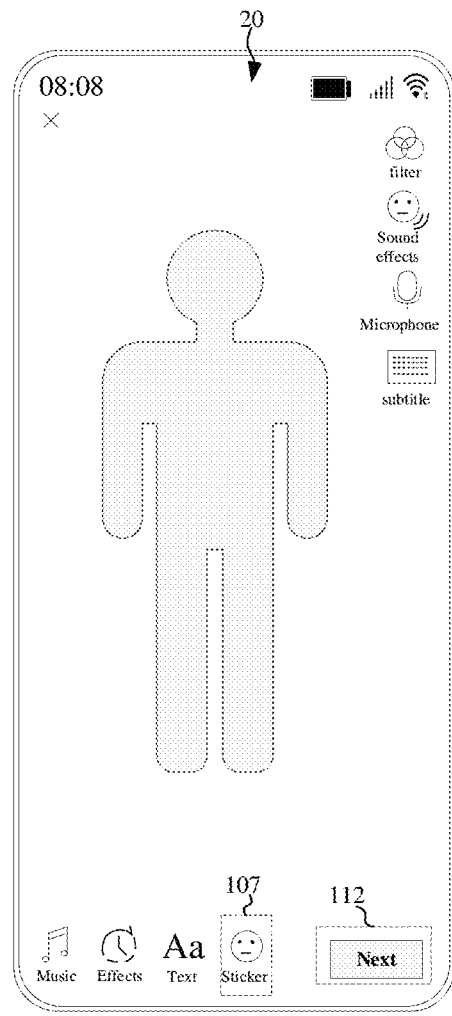
Fig. 1I                                   Fig. 1J

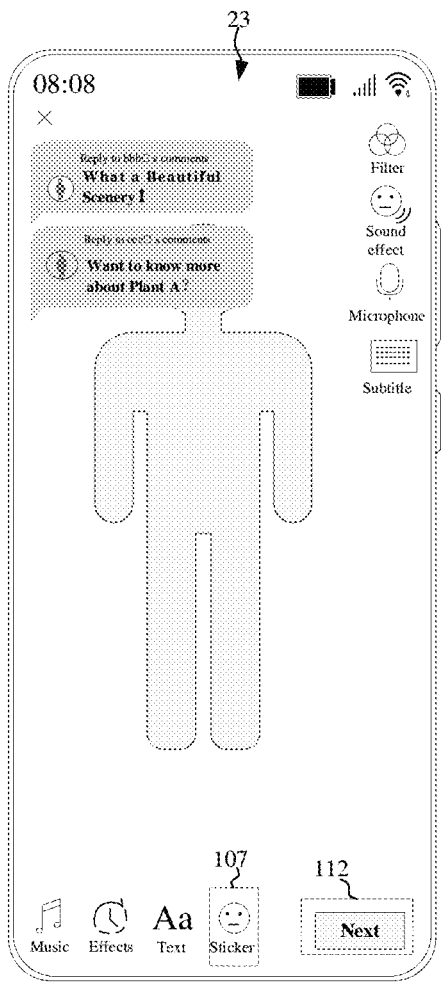
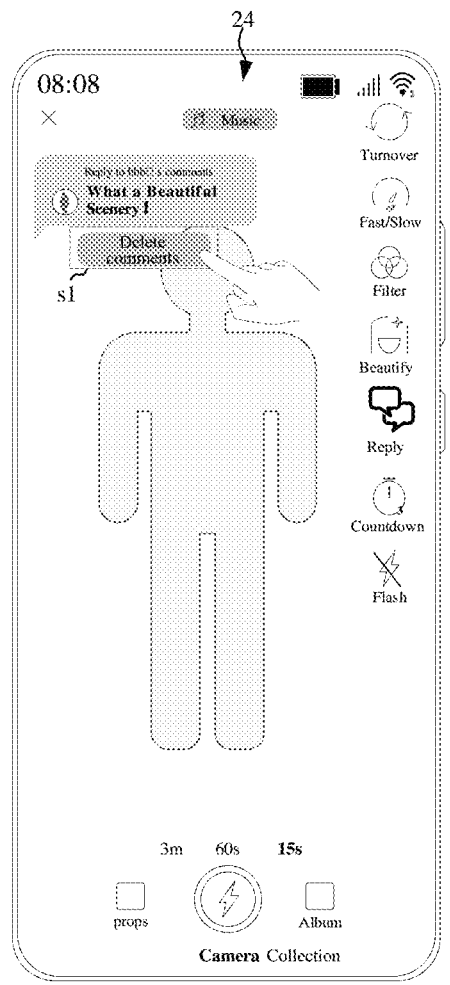
Fig. 1M
Fig. 1N

US 11,899,913 B2

INFORMATION REPLY METHOD, APPARATUS, ELECTRONIC DEVICE, READABLE STORAGE MEDIUM AND PROGRAM PRODUCT

CROSS-REFERENCE TO RELATED APPLICATIONS

This application claims priority to a Chinese Patent Application No. 202111026992.1, filed Sep. 2, 2021, which is hereby incorporated by reference in its entirety.

FIELD OF THE INVENTION

The disclosure relates to the technical field of Internet, in particular to an information reply method, apparatus, electronic device, readable storage medium and program product.

BACKGROUND

With continuous development of Internet technology, users often want to reply to comment information and/or question information for multimedia content when they are watching the multimedia content through a client. At present, when users reply to the comment information and/or question information for multimedia content, only after they find the multimedia content first, display the comment area on a playing interface of the multimedia content, and then find the comment information and/or question information in the comment area, the users can reply to the comment information and/or question information.

The above-mentioned reply mode has more operation steps for users and is not flexible enough, which obviously affects users' interest in reply.

DISCLOSURE OF THE INVENTION

In order to solve the above technical problems or at least partially solve the above technical problems, the present disclosure provides an information reply method, apparatus, electronic device, readable storage medium and program product.

In a first aspect, the present disclosure provides an information reply method, including:
  displaying an entry label for entering an information exhibition page in an authoring page for a first multimedia content, and displaying the information exhibition page in response to a trigger action for the entry label, wherein the information exhibition page comprises one or more pieces of information including information obtained by replying to respective corresponding second multimedia content;
  receiving a trigger action for a target information in the information exhibition page;
  in response to the trigger action for the target information, displaying a sticker corresponding to the target information in the authoring page for the first multimedia content, and replying the target information through the first multimedia content.

In some possible embodiments, displaying an entry label for entering an information exhibition page in an authoring page for a first multimedia content, and displaying the information exhibition page in response to a trigger action for the entry label, comprises:
  receiving a trigger action for a first entry label in a shooting page for the first multimedia content, wherein the authoring page includes the shooting page;
  displaying the information exhibition page in response to the trigger action for the first entry label in the shooting page.

In some possible embodiments, displaying an entry label for entering an information exhibition page in an authoring page for a first multimedia content, and displaying the information exhibition page in response to a trigger action for the entry label, comprises:
  displaying a sticker page in an editing page for the first multimedia content, wherein the authoring page includes the editing page;
  receiving a trigger action for a second entry label in the sticker page to display the information exhibition page.

In some possible embodiments, displaying the sticker page in the editing page for the first multimedia content includes:
  receiving a trigger action for a third entry label in the editing page for the first multimedia content;
  displaying the sticker page in the editing page in response to the trigger action for the third entry label in the editing page, wherein the sticker page includes the second entry label, and the second entry label is used for entering the information exhibition page.

In some possible embodiments, in the information exhibition page, each area corresponding to each information has the same width, and the areas corresponding to one or more information are displayed in two columns aligned up and down.

In some possible embodiments, the receiving the trigger action for the target information in the information exhibition page includes:
  receiving trigger actions corresponding to a plurality of target information in the information exhibition page respectively;
  the displaying the sticker corresponding to the target information in a picture of the first multimedia content in response to the trigger action for the target information comprises:
  in response to trigger actions corresponding to the plurality of target information respectively, displaying first stickers corresponding to the plurality of target information respectively in the authoring page for the first multimedia content.

In some possible embodiments, the replying to the target information through the first multimedia content includes:
  displaying a publication page corresponding to the first multimedia content, wherein the publication page comprises a target link, wherein the target link is used for display in the playing page for the first multimedia content;
  publishing the first multimedia content and the target link in response to an trigger action for a publication control in the publication page.

In some possible embodiments, the replying to the target information through the first multimedia content further comprises:
  sending the first multimedia content and the target information to a server device, so that the server device sends a notification message to a client associated with the target information; wherein the notification message is used to notify the associated client that the first multimedia content is used to replay to the target information.

In a second aspect, the present disclosure provides an information reply apparatus, including:

a displaying module, configured to display an entry label for entering an information exhibition page in an authoring page for a first multimedia content, and display the information exhibition page in response to a trigger action for the entry label, wherein the information exhibition page comprises one or more pieces of information including information obtained by replying to respective corresponding second multimedia content;

a receiving module configured to receive a trigger action for a target information in the information exhibition page;

the displaying module is further configured to, in response to the trigger action for the target information, display a sticker corresponding to the target information in the authoring page for the first multimedia content, and a replying module, configured to reply the target information through the first multimedia content.

In a third aspect, the present disclosure provides an electronic device, including a memory, a processor and computer program instructions;

the memory is configured to store the computer program instructions; the processor is configured to execute the computer program instructions to carry out the information reply method according to any one of the first aspects.

In a fourth aspect, the present disclosure provides a readable storage medium, including computer program instructions that, when running on an electronic device, cause the electronic device to carry out the information reply method according to any one of the first aspects.

In a fifth aspect, the present disclosure provides a program product, including computer program instructions;

the computer program instructions are stored in a readable storage medium, and at least one processor of an electronic device reads the computer program instructions from the readable storage medium; the at least one processor executes the computer program instructions, so that the electronic device carries out the information reply method according to any one of the first aspects.

The invention discloses an information reply method, apparatus, electronic device, readable storage medium and program product, wherein the method comprises the following steps: displaying an entry label for entering an information exhibition page in an authoring page for a first multimedia content, and displaying the information exhibition page in response to a trigger action for the entry label, wherein the information exhibition page comprises one or more pieces of information including information obtained by replying to respective corresponding second multimedia content; in response to the trigger action for the target information, displaying a sticker corresponding to the target information in the authoring page for the first multimedia content, and replying the target information through the first multimedia content. In the process of authoring the first multimedia content, an entry label into the information exhibition page is provided, and through the information page display, users can select the target information they want to reply or comment on, thus reducing the complexity of user operation; and that target information is display in the authoring page for the first multimedia content in the form of sticker to correlate the first multimedia content with the target information, so as to reply or comment on the target information in the form of multimedia, which not only enriches the reply manners, enhances the interest of users in replying to the target information, but also improves the probability of users authoring and publishing multimedia content.

DESCRIPTION OF THE DRAWINGS

The accompanying drawings, which are incorporated into and constitute a part of this specification, illustrate embodiments consistent with this disclosure and, together with the description, serve to explain the principles of this disclosure.

In order to more clearly explain the embodiments of this disclosure or the technical solutions in the prior art, the following will briefly introduce the drawings that need to be used in the description of the embodiments or the prior art. Obviously, for those ordinary skilled in the field, other drawings can be obtained according to these drawings without paying creative effort.

DETAILED DESCRIPTION OF PREFERRED EMBODIMENTS

Figure 1A:
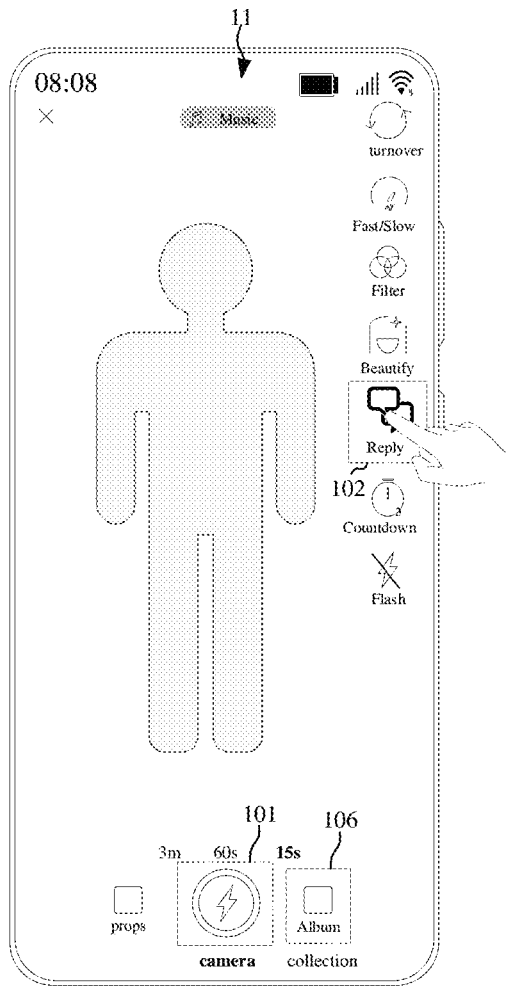
FIGS. 1A to 1R are schematic diagrams of human-machine interaction interfaces according to embodiments of the disclosure.

In order to better understand the above objects, features and advantages of the present disclosure, the solution of the present disclosure will be further described below. It should be noted that the embodiments of the present disclosure and the features in the embodiments can be combined with each other without conflict.

In the following description, many specific details are set forth in order to fully understand the present disclosure, but the present disclosure may be implemented in other ways different from those described herein; obviously, the embodiments in the specification are only a part of the embodiments of the present disclosure, not all of them.

Illustratively, the present disclosure provides an information reply method, apparatus, electronic device, readable storage medium and program product, wherein the method provides an entry label for an information exhibition page in an authoring page for a first multimedia content, and based on the entry label, users can enter the information exhibition page, and users can view the information exhibited in the information exhibition page and select a target information to which they want to reply therefrom, thus reducing complexity of user operation; after that, the target information is displayed in the authoring page for the first multimedia content in the form of sticker, so that the first multimedia content is associated with the target information, and replying to the target information in the form of multimedia can be implemented, which not only enriches the reply manners, enhances the interest of users in replying to the target information, while improving the probability of users authoring and publishing multimedia content.

In addition, replying to the target information mentioned in this disclosure may include: replying to the target information, or commenting on the target information, or questioning about the target information, etc.

In addition, replying to the target information in the form of multimedia mentioned in this disclosure can be interpreted as replying to the target information with multimedia contents, or replying to the target information with multimedia contents and links associated with the target information, or replying to the target information with multimedia contents, links associated with the target information and text contents. Among them, the multimedia contents mentioned in this disclosure include, but is not limited to, audio and/or video, wherein the video can be a video that has been shot or recorded in an electronic device, or a video that users shot in real time when authoring.

Among them, the information exhibition page mentioned in this disclosure is used to exhibit one or more pieces of information, and the information in the information exhibition page may include collected information, recommended information, invited-to-answer information, and so on. In the information page exhibition, each piece of information corresponds to a second multimedia content, and the second multimedia contents corresponding to a plurality of pieces of information respectively may be the same or different, which is not limited in this disclosure. And the information may include information about commenting on, questioning about the corresponding second multimedia, replying to existing comments and so on. According to the disclosure, in the information exhibition page, the information can be expressed by text, emoticon, picture, link, animation, symbol, number, time, etc. The presentation form or expression form of the information in the information exhibition page is not limited in the present disclosure.

The target information mentioned in this disclosure is associated with a respective corresponding second multimedia content, and the target information may include information about such as commenting on, replying to or questioning about the respective corresponding second multimedia content. In some embodiments, the target information may include comment information, reply information and/or question information. The information can be expressed by text, emoticon, picture, link, animation, symbol, number, time, etc. In addition, the target information can also be expressed in sentence patterns such as statement, question, exclamation and rhetorical question, etc. The presentation form or expression form of the target information is not limited in the present disclosure.

In addition, the authoring page for the first multimedia content mentioned in this disclosure may include a shooting page and/or an editing page. The shooting page is used to obtain image materials of the first multimedia content, and the editing page is used to clip the image materials to obtain the first multimedia content; the page layouts of shooting page and editing page are not limited in the present disclosure. And The duration, aspect ratio, resolution and specific contents of the first multimedia content are not limited in the present disclosure.

Among them, the editing page can also be referred to as other names, such as clipping page, production page, etc., which is not limited in the present disclosure.

The information reply method provided in this disclosure can be realized by electronic devices, or applications (apps) and web pages in the electronic devices. Electronic devices may include mobile phones, tablet computers, wearable electronic devices, vehicle-mounted devices, augmented reality (AR)/virtual reality (VR) devices, notebook computers, ultra-mobile personal computer (UMPC), netbooks, personal digital assistant (PDAs), smart TVs, smart screens, high-definition TVs, 4K TVs, smart speakers, smart projectors and other smart home devices. The specific types of electronic devices are not limited in the present disclosure.

In this disclosure, the types of operating systems for the electronic devices are not limited, and can be, such as, Android system, Linux system, Windows system, iOS system, etc.

Based on the foregoing description, the specific implementation of the information reply method provided by the embodiment of this disclosure will be described in detail below, taking the electronic device being a mobile phone and a video application program (referred to as Application 1 for short) having been installed in the mobile phone as an example, combined with the schematic diagrams of human-machine interaction interface provided by FIGS. 1A to 1R.

Figure 1B:
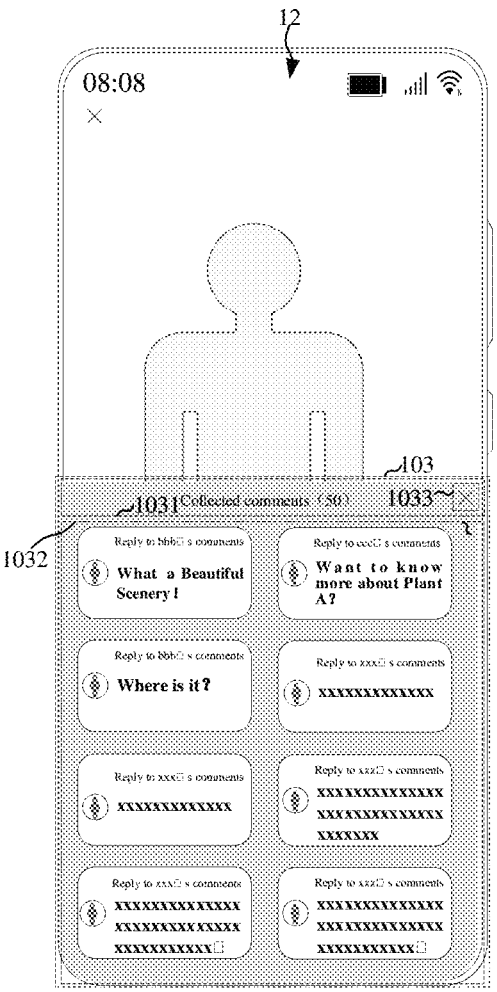
Figures 1E, 1F:
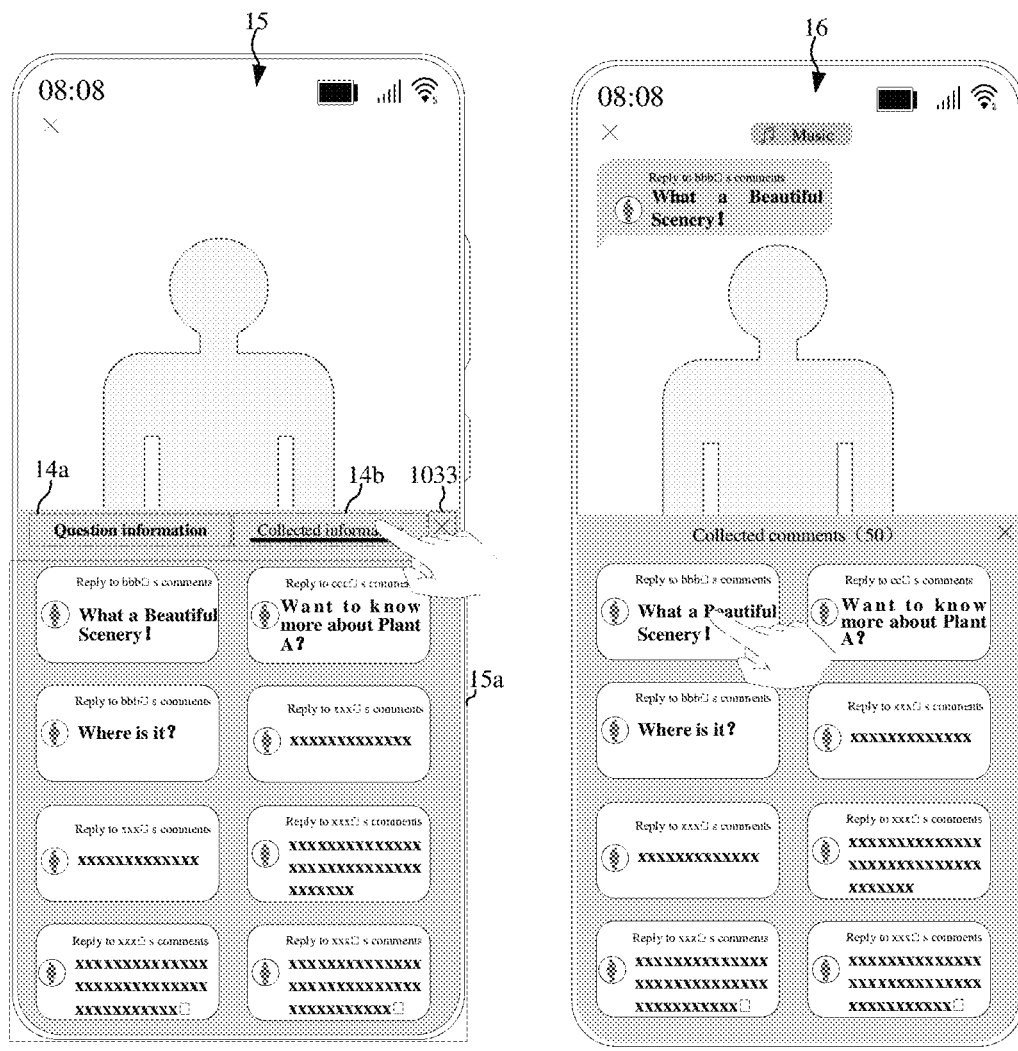
Figure 1G:
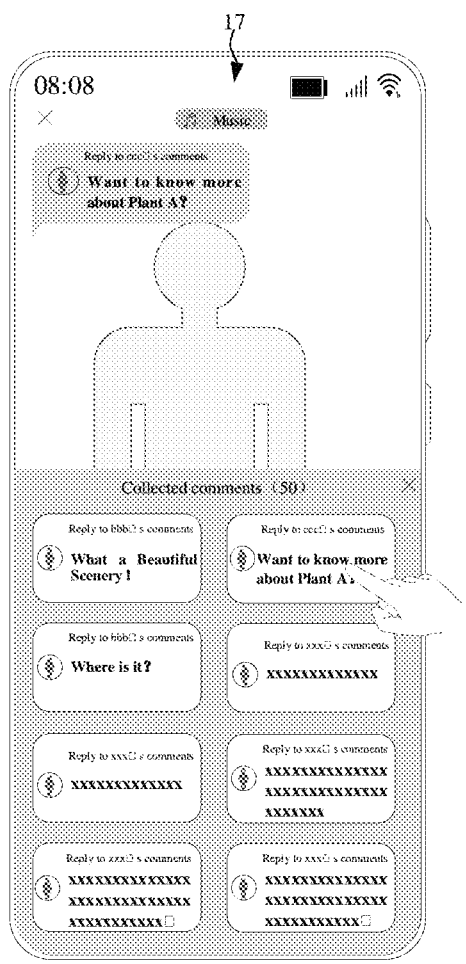
Figure 1H:
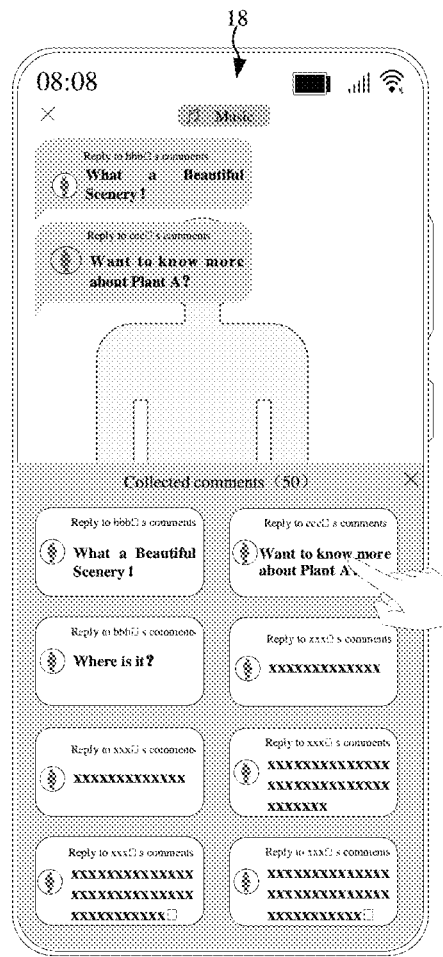
Figure 1K:
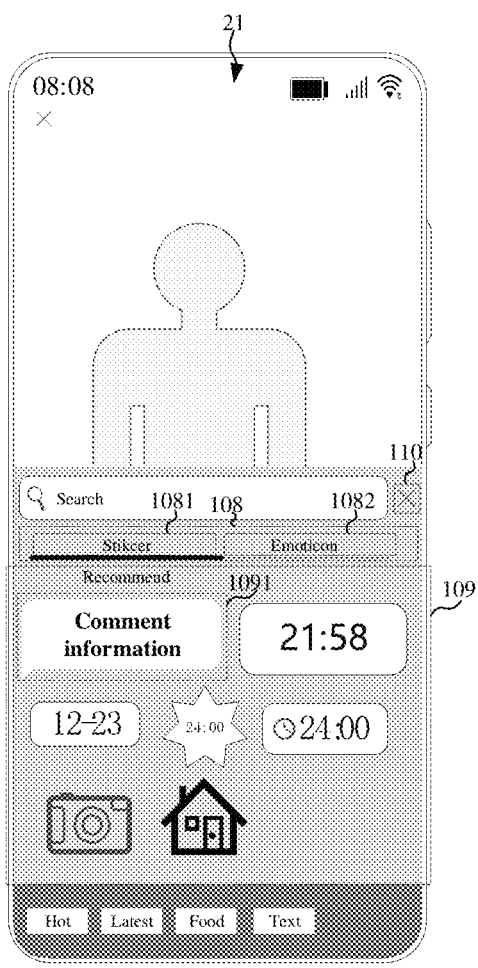
Figure 1L:
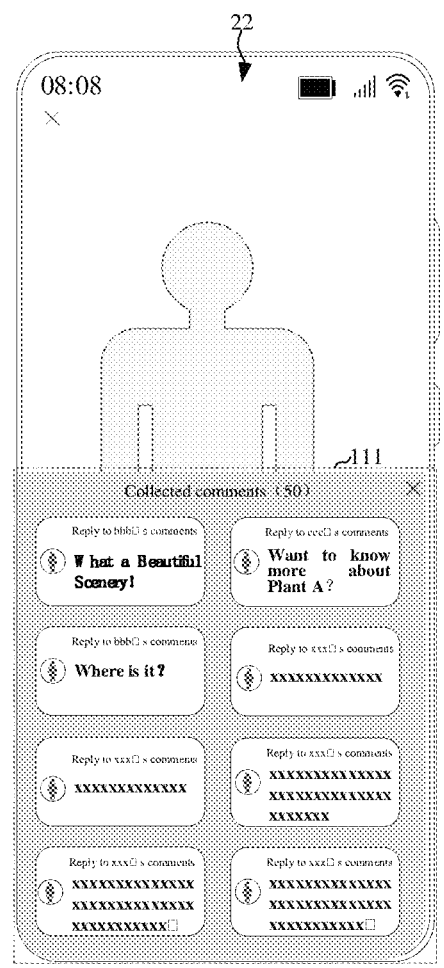
Figure 1O:
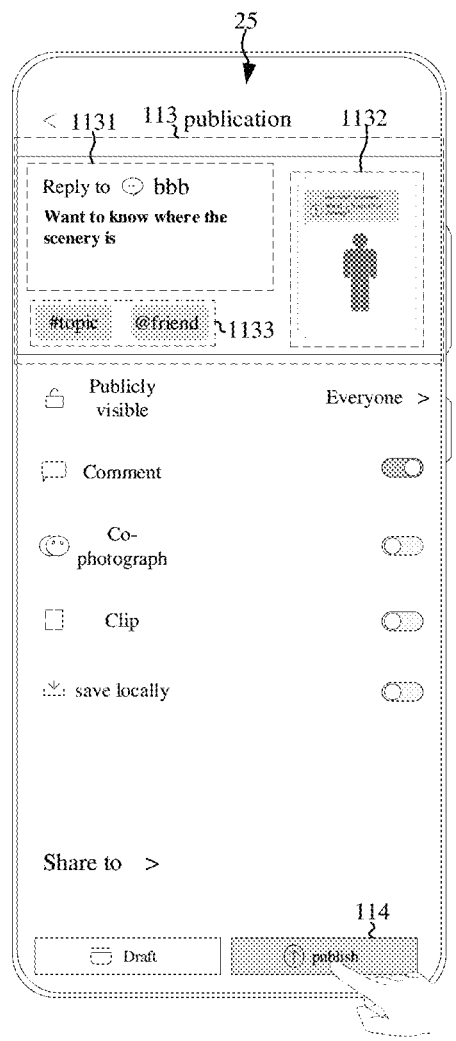
Figure 1P:
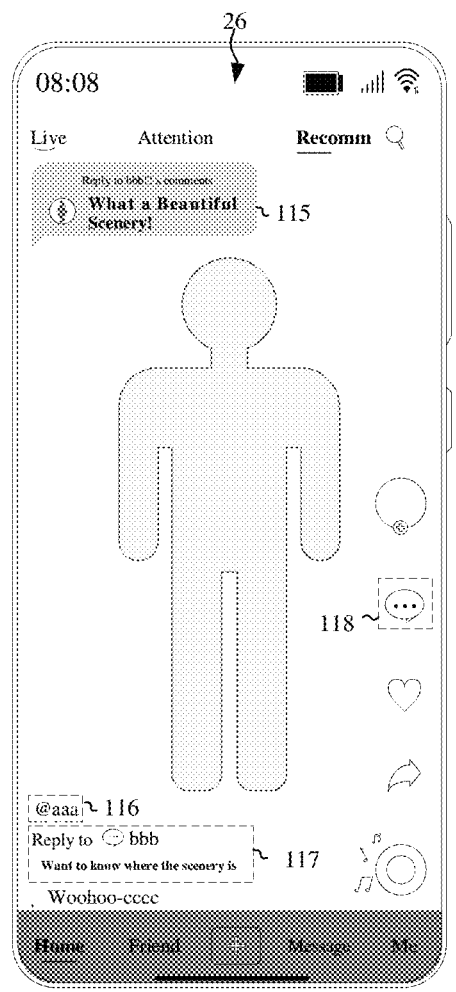
Figure 1Q:
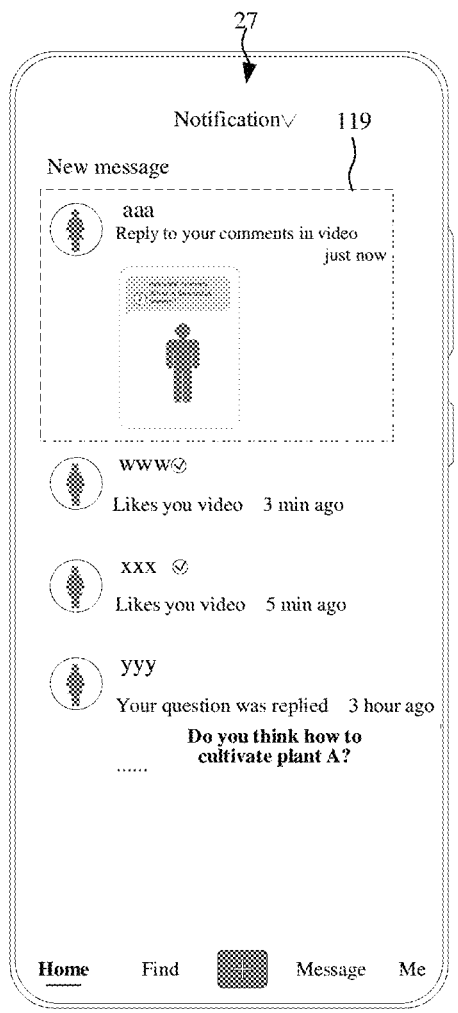
Figure 1R:
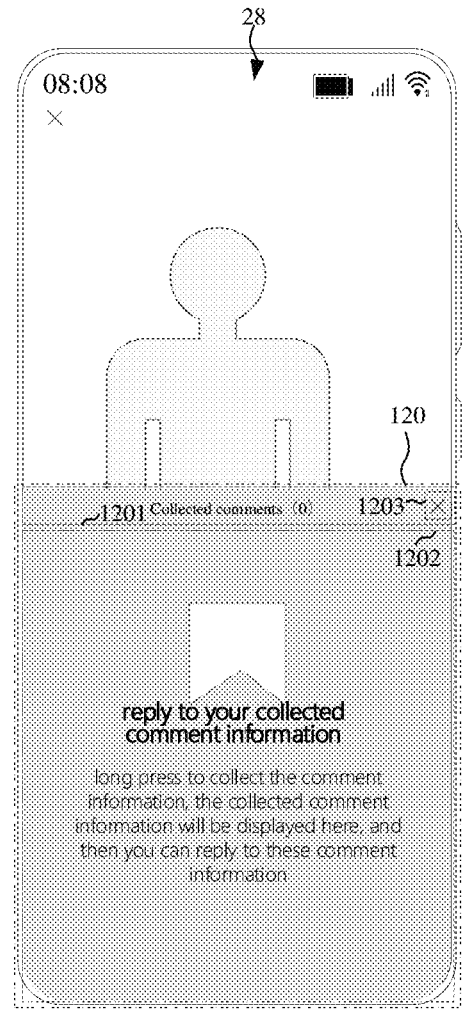

In FIGS. 1A to 1R, user 2 publishes a video 1, user 3 posts comment information 1 for the video 1, and a sticker 1 is used to display the comment information 1; user 4 posts comment information 2 for a video 2, and the sticker 2 is used to display the comment information 2; user 5 posts comment information 3 for the video 1, and sticker 3 is used to display the comment information 3; and the user 1 collects the comment information 1, the comment information 2 and the comment information 3.

On this basis, user 1 authors a first multimedia content (hereinafter referred to as video 0), and replies to one or more of the comment information 1, the comment information 2 and the comment information 3 in the form of multimedia.

In this scheme, the authoring page for the video 0 can include a shooting page and an editing page. Therefore, next, it will be introduced in detail that based on the entry labels provided by the shooting page and/or the editing page respectively, a sticker corresponding to a target information to be replied is added, so as to reply to the target information in the form of multimedia.

Situation 1: Add the sticker corresponding to the target information to be replied based on the entry label provided by the shooting page.

For example, after Application 1 is started, Application 1 can display the user interface 11 as shown in FIG. 1A on the mobile phone, wherein the user interface 11 is a shooting page, and the shooting page can include a collection of multiple functions, and the shooting page is mainly used for acquiring image materials of video 0.

The manners of acquiring the image materials of video 0 are not limited in the present disclosure. For example, the image materials of video 0 can be photos and/or videos taken in real time, or photos and/or videos which are already taken and stored in a memory module of a mobile phone.

For example, as shown in FIG. 1A, the user interface 11 includes a shooting control 101, Application 1 receives a shooting start trigger action (such as a click action or a long press action) for the shooting control 101, and in response to the trigger action for the shooting control 101, Application 1 can start recording video, when the recorded video reaches a preset duration or Application 1 receives a shooting end trigger action (such as a click action or a pop-up action) for the shooting control 101, Application 1 ends recording video, and the recorded video is the image materials of video 0.

It should be noted that Application 1 can also record multiple video clips by triggering the shooting control 101 multiple times, and the multiple video clips are the image materials of video 0.

The parameters of the image materials of video 0 are not limited in the present disclosure, they can be, such as, duration, aspect ratio, duration, filter effect, flash effect, resolution, etc.

Continue to refer to FIG. 1A, the user interface 11 includes: an entry label 102. The entry label 102 is used to enter an information exhibition page. The entry label 102 can be exhibited in the form of icon, text, symbol, picture, etc., or it can be exhibited in a manner of combining multiple forms. The display parameters, such as, color, size and the like, adopted by the entry label 102 are not limited in the present disclosure. For example, as shown in FIG. 1A, the entry label 102 is displayed in the form of "icon+text (such as reply)".

In combination with the foregoing, the information exhibition page can display collected information, recommended information, invited-to-answer information, and so on. The following gives an exemplary introduction by taking the information exhibition page displaying information collected by user 1 and the information exhibition page displaying collected information, recommended information and invited-to-answer information as examples.

In some embodiments, Application 1 receives a trigger action (such as a click action) for the entry label 102, and in response to the trigger action for the entry label 102, Application 1 can exemplarily display the user interface 12 as shown in FIG. 1B on the mobile phone.

Referring to FIG. 1B, the user interface 12 includes an area 103 for displaying an information exhibition page. The display parameters of the area 103, such as, size, color, display position, display transparency and so on, are not limited in the present disclosure. Among them, the information exhibition page displayed by the area 103 can be set at the upper layer of the shooting page, so that the user can preferentially see each information in the information exhibition page.

It should be noted that other areas in the user interface 12 except the area 103 can display pictures related to the shooting page, and users can see partial pictures in the shooting page through other areas except the area 103 when viewing the information exhibition page.

In FIG. 1B, the area 103 may include an area 1031, an area 1032 and a control 1033.

The area 1031 is used to exhibit the title of the information exhibition page, where the title can be exhibited in the form of icon, text, digit, etc. For example, a content of "collected comments+number of collected comments" can be displayed in the area 1031, so that the user can clearly know that the page exhibits collected comment information and the number of collected information. For example, in FIG. 1B, "collected comments (50)" is shown as an example.

The area 1032 is used to display collected information. If Application 1 has collected multiple pieces of information, each piece of collected information can be exhibited in the area 1032 in the form of sticker. The display parameters of stickers corresponding to respective piece of information in the area 1032, such as size, shape, color, display position, display transparency and display order, etc., are not limited in the present disclosure.

In some embodiments, in the area 1032, stickers corresponding to respective pieces of information can have the same sizes, and can be arranged in the order from left to right and top to bottom. If the size of an area corresponding to each sticker cannot display the content related to the comment information, the content of the information can be folded displayed, and the user can view the content related to the information by triggering a sticker corresponding area, so that more collected information can be displayed in the area 1032.

In some embodiments, in the area 1032, the sizes of the areas of stickers corresponding to respective pieces of information may not be completely the same, so that the area corresponding to each sticker can display as many contents related to the information as possible, without folded displaying contents of the information, and users can directly and clearly obtain the contents related to the information. Among them, the content related to each piece of information may include, but not limited to, text content of the information published by the user, the avatar of the user who publishes the information, the nickname of the user who publishes the information, which user publishes multimedia content or comment information the information is replying to, etc.

In conjunction with the description about the area 1032, the areas of stickers corresponding to the information are displayed in multiple columns, for example, two columns, in the information exhibition interface.

For example, in the user interface 12 shown in FIG. 1B, it is exemplarily shown that the areas of stickers corresponding to a plurality of pieces of collected information in the information exhibition page have the same width and the same height, and are displayed in two columns in a manner of being aligned up and bottom.

Among them, taking the nickname of user 2 being "bbb", the nickname of user 3 being "ccc", the nickname of user 4 being "ddd" and the nickname of user 5 being "eee" as an example, sticker 1, sticker 2 and sticker 3 corresponding to comment information 1, comment information 2 and comment information 3 are displayed in the area 1032 as shown in FIG. 1B.

With Reference to FIG. 1B, taking sticker 1 as an example, the avatar and nickname of user 3 are displayed on the left of the area corresponding to sticker 1; the text content "Reply to bbb's comment" is displayed at the upper of sticker 1 to indicate that sticker 1 is a comment for user "bbb"; text content 1 "The scenery here is so beautiful!" is displayed at the bottom of text content, where the text content 1 is the text content of comment information 1 posted by user 3 for video 1.

Sticker 2 and sticker 3 are similar to sticker 1, which can be referred to that shown in FIG. 1B and will not be repeated here. It should be noted that because the text content 2 corresponding to sticker 2 is long, the text content can't be fully displayed in the area corresponding to sticker 2, so the text content 2 is folded displayed.

In FIG. 1B, "xxx" in "Reply to xxx's comments" represents the nickname of the user, and multiple "xxx" in FIG. 1B can represent different users; multiple "x" included in the comment information represent the text content of the collected information, and the number of "x" being different represents the lengths of the text contents of the comment information being different. Therefore, in FIG. 1B, the text contents of multiple stickers displayed in the area 1032 are not completely the same, which is only used to show an implementation manner in which the comment information is exhibited in the form of sticker in the information exhibition page.

In FIG. 1B, it is exemplarily shown that the areas corresponding to stickers have the same width and the same height, and are arranged in two aligned columns for displaying the collected information. In actual scenes, they can also be displayed as one column, three columns or more columns. The number of columns is not limited in the present disclosure. In addition, how many columns are specifically used for displaying information can also be configured in conjunction with the state that the screen of mobile phone is in horizontal or vertical, and so on.

In some other embodiments, in response to the trigger action for the first entry label 102 shown in FIG. 1A, the application 1 may also display the user interface 13 shown in FIG. 1C on the mobile phone, in which the user interface 13 exemplarily shows that in the information exhibition page, the areas of stickers corresponding to a plurality of collected information are the same in width but not completely the same in height, and are displayed in two columns in an up-down alignment manner.

For example, as shown in FIG. 1C, in area 1032, the areas corresponding to sticker 1 and sticker 2 respectively are same in length and width, the area corresponding to sticker 3 is smaller than those corresponding to sticker 1 and sticker 2, and the areas corresponding to other stickers in area 1032 except sticker 1 to sticker 3 are also different in sizes, and they are displayed in two columns.

In the manner shown in FIG. 1C, the area corresponding to each sticker can display all contents related to the information, without folded displaying information, and users can directly and clearly view all contents of the collected information.

Among them, FIG. 1C exemplarily shows that the areas corresponding to stickers are the same in width but not completely the same in height, and are arranged in two aligned columns for displaying the collected information. In actual scenarios, they can also be displayed as one column, three columns or more columns. The number of columns is not limited in the present disclosure. In addition, how many columns are specifically used for displaying information can also be configured in conjunction with the state that the screen of mobile phone is in horizontal or vertical, and so on.

According to the embodiment of the disclosure, the information displayed in the information exhibition page can be arranged and displayed in a preset order. For example, in the embodiments shown in FIG. 1B and FIG. 1C, when the information exhibition page displays the collected information, the sticker corresponding to the latest collected comment information may be close to the upper part of the area 1032, and the sticker corresponding to the earliest collected comment information may be close to the bottom part of the area 1032.

Control 1033 is used to exit the information exhibition page. The display parameters of the control 1033, such as display manner, display position, size, color, etc., are not limited in the present disclosure. For example, the control 1033 can be displayed in the form of icon, text, symbol, etc. The control 1033 can be located near the vertex of the area 103. In the embodiments shown in FIG. 1B and FIG. 1C, the control 1033 is displayed by the symbol "X". In response to a trigger action (such as a click action) for the control 1033, Application 1 can jump to the user interface 11 shown in FIG. 1A.

In the embodiments shown in FIG. 1B and FIG. 1C, the information collected by user 1 is displayed on the information exhibition page. In some embodiments, the information exhibition page can display various types of information, such as collected information, invited-to-answer information, more-question information and so on. Next, through the embodiments shown in FIG. 1D and FIG. 1E, the implementation of displaying collected information, invited-to-answer information and more-question information in the information exhibition page will be described in detail.

In this disclosure, the information for being displayed in the information exhibition page can be divided into various types, and the information exhibition page is provided with entries to sub-exhibition pages corresponding to different types of information, so as to display various types of information classifiedly. And when the information exhibition page is entered, the sub-exhibition page corresponding to any type of information can be displayed by default.

In the embodiments shown in FIG. 1D and FIG. 1E, it is assumed that a first type of information includes the invited-to-answer information and the more-question information, and a second type of information includes the collected information.

In some embodiments, Application 1 receives a trigger action (such as a click action) for a first entry label provided in the area 102, and in response to the trigger action for the first entry label, Application 1 exemplarily displays the user interface 14 shown in FIG. 1D on the mobile phone. In the user interface 14 shown in FIG. 1D, the information exhibition page displays the sub-exhibition pages corresponding to the first type of information by default.

In FIG. 1D, the user interface 14 includes an area 14a, an area 14b and an area 14c.

Among them, the area 14a is used to provide an entry label for entering the sub-exhibition page corresponding to the first type of information. The area 14b is used to provide an entry label for entering the sub-exhibition page corresponding to the second type of information. The first type of information includes the invited-to-answer information and the more-question information, and the second type of information includes the collected information.

Among them, the area 14a can exhibit the entry label for entering the sub-exhibition page corresponding to the first type of information in the form of icon, text, digit, symbol, picture, etc., similarly, the area 14b can exhibit the entry label for entering the sub-exhibition page corresponding to the second type of information in the form of icon, text, digit, symbol, picture, etc. For example, as shown in FIG. 1D, the text content "question information" is displayed in area 14a, and the text content "collected information" is displayed in area 14b, FIG. 1D is only an example, and in practical application, area 14a and area 14b can be implemented in other ways, which are not limited in this disclosure.

Area 14c is used to display a sub-exhibition page corresponding to the first type of information.

Among them, the area 14c includes area 14c1, area 14c2, control 14c3, area 14c4, area 14c5 and control 14c6.

The area 14c1 is used to display a title information of a first sub-type included in the first type. The area 14c1 can perform the exhibition in the form of icon, text, symbol, picture, etc., or can perform the exhibition in a manner of combining multiple forms, the exhibition manner of the area 14c1 is not limited in the present disclosure. For example, the first sub-type is the invited-to-answer information, and the text content "Invite you to answer" can be displayed in the area 14c1.

Area 14c2 is used to show the first subtype of information. The area 14c2 can exhibit the first subtype of information in the form of sticker. In the area 14c2, the areas of stickers corresponding to the information may have the same or different sizes. The area of the sticker corresponding to the information can display the text content of the question invited to answer, the avatar, nickname of the user who publishes the question, and so on.

Referring to FIG. 1D, in the area 14c2, the area of the sticker corresponding to each piece of information may have the same width and different height, and the areas are displayed in two columns horizontally aligned according to the upper edge of the sticker area, and all relevant contents of each piece of information are fully displayed in the sticker area.

Of course, in the area 14c2, the area of the sticker corresponding to each piece of information may have the same width. And their heights are the same, if the information has more contents, the contents of information can be folded displayed. This is similar to the embodiment shown in FIG. 1C.

Control 14c3 is used to display more first sub-type of information. This disclosure does not limit the exhibition manner of the control 14c3. For example, the control 14c3 can be exhibited in the form of icon, text, symbol, picture, etc., or it can be exhibited in a manner of combing multiple forms. For example, Application 1 receives a trigger action (such as a click action) for the control 14c3, and Application 1 can display a preset number of first sub-type of information in the area 14c2. At this time, the size of the area 14c2 can be adjusted according to the preset number, and the control 14c3 is displayed below the preset number of first sub-type of information, so that the user can view more first sub-type of information.

The area 14c4 is used to display a title information of a second sub-type included in the first type. The area 14c4 can perform the exhibition in the form of icon, text, symbol, picture, etc., or can perform the exhibition in a manner of combining multiple forms, and the exhibition manner of the area 14c4 is not limited in the present disclosure. For example, the second subtype is the more-question information, which includes information that is closer to the information collected by users. How to determine more question information is not limited in the present disclosure, and the area 14c4 can display, for example, the text content "More question information for you".

Area 14c5 is used to exhibit the second sub-type of information. The area 14c5 can display the second sub-type of information in the form of sticker. In the area 14c5, the areas of stickers corresponding to the information may have the same or different sizes. The area of the sticker corresponding to the information can display the text content of the question invited to answer, the avatar, nickname of the user who publishes the question, and so on. In the area 14c5, the areas of stickers corresponding to the information are displayed in two columns.

Referring to FIG. 1D, in the area 14c5, the area of the sticker corresponding to each piece of information may have the same width and different height, and the areas are displayed in two columns horizontally aligned according to the upper edge of the sticker area, and all relevant contents of each piece of information are fully displayed in the sticker area.

Of course, in the area 14c5, the area of the sticker corresponding to each piece of information may have the same width. And their heights are the same, if the information has more contents, the contents of information can be folded displayed. This is similar to the embodiment shown in FIG. 1C.

In FIG. 1D, control 14c6 is used to display more second sub-type of information. The exhibition manner of the control 14c6 is not limited in the present disclosure. For example, the control 14c6 can be exhibited in the form of icon, text, symbol, picture, etc., or it can be exhibited in a manner of combing multiple forms. For example, Application 1 receives a trigger action (such as a click action) for the control 14c6, and Application 1 can display a preset number of second sub-type of information in the area 14c6. At this time, the size of the area 14c5 can be adjusted according to the preset number, and the control 14c6 is displayed below the preset number of second sub-type of information, so that the user can view more second sub-type of information.

FIG. 1D exemplarily shows the implementation mode of a sub-exhibition page corresponding to the first type of information when the first type includes the first sub-type and the second sub-type. In actual scenarios, the first type may include more subtypes, and an implementation mode similar to that of the first subtype and the second subtype may also be adopted, which will be not repeated here for brevity.

In addition, FIG. 1D exemplarily shows that the areas corresponding to stickers have the same width and the same height, and are arranged in two aligned columns for displaying the collected information. In actual scenarios, they can also be displayed as one column, three columns or more columns. The number of columns is not limited in the present disclosure. In addition, how many columns are specifically used for displaying information can also be configured in conjunction with the state that the screen of mobile phone is in horizontal or vertical, and so on.

In some embodiments, Application 1 receives a trigger action (such as a click action) for the first entry label provided in the area 102, and in response to the trigger action for the first entry label, Application 1 exemplarily displays the user interface 15 shown in FIG. 1E on the mobile phone. In the user interface 15 shown in FIG. 1E, the information exhibition page displays a sub-exhibition page corresponding to the second type of information by default.

Referring to FIG. 1E, the user interface 15 includes an area 15a.

The area 15a is used for displaying the sub-exhibition page corresponding to the second type of information. The exhibition and implementation of area 15a can be performed in a manner similar to that of implementation of area 1032 in the previous embodiments shown in FIG. 1B and FIG. 1C, and will not be repeated here for brevity. FIG. 1E exemplarily shows that the areas of stickers corresponding to the collected information have the same size and are displayed in two columns aligned up and down.

In practical application, it is possible to switch between a sub-exhibition page corresponding to the first type of information and a sub-exhibition page corresponding to the second type of information, through the entry labels provided by the area 14a and the area 14b respectively.

In the embodiments shown in FIGS. 1D and 1E, the information exhibition page further includes a control 1033 for exiting the information exhibition page, and the control 1033 in FIGS. 1D and 1E has the same function as that of the control 1033 in the embodiments shown in FIGS. 1B and 1C. Reference can be made to the previous description of the embodiment shown in FIGS. 1B and 1C.

In the embodiments shown in FIG. 1D and FIG. 1E, the information displayed in the information exhibition page can be arranged and displayed in a preset order. For example, in FIG. 1D, when the information exhibition page displays the first type of information, according to the publication time, the sticker corresponding to the latest released question information invited-to-answer can be displayed close to the upper part near the area 14c2, and the sticker corresponding to the earliest released question information invited-to-answer can be displayed close to the bottom part of the area 14c2; in another example, in FIG. 1E, when the information exhibition page exhibits the collected information, the sticker corresponding to the latest collected comment information can be located close to the upper part of the area 15a, and the sticker corresponding to the earliest collected comment information can be located close to the bottom part of the area 15*a*.

With reference to FIG. 1A continuously, the user interface 11 may also include other controls associated with the shooting page, such as a control for entering a music library, a control for exiting the shooting page, a control for adjusting the shooting mode, a control for entering a special effects exhibition page, a control for entering a filter exhibition page, and so on. The implementation manner of these controls associated with the shooting pages is not limited in the present disclosure.

By means of the manner shown in any of the embodiments shown in FIGS. 1B to 1E, one or more pieces of target information that want to reply can be selected from the information exhibition page. Next, taking the embodiment shown in FIG. 1B as an example, we will continue to introduce the information reply method provided by the present disclosure.

Continue to refer to the embodiment shown in FIG. 1B, assuming that Application 1 receives a trigger action (such as a click action) for the sticker 1, and in response to the trigger action for the sticker 1, Application 1 exemplarily displays the user interface 16 shown in FIG. 1F on the mobile phone, with reference to the user interface 16 shown in FIG. 1F, the sticker 1 has been displayed in the shooting page, and the sticker 1 can not block the shooting picture or try not to block the shooting picture. For example, the sticker 1 can be displayed at a position near the vertex or side of the user interface.

On the basis of the embodiment shown in FIG. 1F, if Application 1 receives the trigger action for the sticker 2, in some embodiments, Application 1 will replace the sticker 1 with the sticker 2, such as the embodiment shown in FIG. 1G; in some embodiments, application 1 will display the sticker 1 and the sticker 2 in the authoring page (that is, the shooting page) on the basis of displaying the sticker 1.

In some embodiments, Application 1 jumps from the user interface 16 shown in FIG. 1F to the user interface 17 shown in FIG. 1G, and referring to the user interface 17 shown in FIG. 1G, sticker 2 has replaced sticker 1. That is, Application 1 can support replying to a single target information, and the picture area of the video blocked by the single target information is relatively small. Therefore, after video 0 and the information related to the target information are published, the whole picture in video 0 is concise and convenient for users to view.

In other embodiments, Application 1 jumps from the user interface 16 shown in FIG. 1F to the user interface 18 shown in FIG. 1H, and with reference to the user interface 18 shown in FIG. 1H, both the sticker 1 and the sticker 2 are displayed in the shooting page. That is, Application 1 can support replying to multiple comment information, and can meet a need that a user can reply to multiple messages at the same time through the same multimedia content, thus providing more possibilities for video authoring.

In FIG. 1H, the sticker 1 corresponding to the comment information 1 and the sticker 2 corresponding to the comment information 2 can be displayed in a single column in the order of top-down alignment, and the areas corresponding to the sticker 1 and the sticker 2 respectively do not block each other. The display manners of stickers in the shooting page are not limited in the present disclosure.

As shown in FIG. 1G and FIG. 1H respectively, the display parameters of sticker 1 and sticker 2 in the shooting page may be different from those of sticker 1 and sticker 2 in the information exhibition page, and the display parameters include, for example, display transparency, font size, etc. For example, the display transparencies of sticker 1 and sticker 2 in FIGS. 1G and 1H can be higher than that in the information exhibition page, and the font sizes of sticker 1 and sticker 2 in FIGS. 1G and 1H can be smaller than that in the information exhibition page, and these display parameters can be flexibly set, which are not limited in this disclosure.

In addition, in the embodiments shown in FIGS. 1G and 1H, sticker 1 and sticker 2 can be displayed at positions near the top or side of the shooting page, so that the areas corresponding to the stickers do not block or try not to block the shot picture.

In practice, when Application 1 supports the user to reply to multiple pieces of target information through video 0, the maximum number of target information that can be replied to can be set, so as to avoid a phenomenon that the user add too many stickers corresponding to target information to cause stickers corresponding to these target information respectively to block the picture of video 0.

For example, in conjunction with the embodiments shown in FIG. 1F and FIG. 1H, it is assumed that Application 1 supports the user to reply to N (e.g., N=2) pieces of comment information through the first multimedia content, Application 1 receives a trigger action for sticker 3, and in response to the trigger action for sticker 3, Application 1 exemplarily displays the user interface 19 shown in FIG. 1I on the mobile phone, and with reference to the user interface 19 shown in FIG. 1I, Application 1 can display prompt information in the user interface 19, the prompt information being used to indicate the maximum number of target information that can be replied to in the form of multimedia currently.

In FIG. 1I, the user interface 19 includes an area 104.

The area 104 is used to display the text content of the prompt information. For example, in FIG. 1I, the text content "reply to at most two comment information" can be displayed in the area 104. Of course, the prompt information can also be implemented in other ways, such as other text content, animation special effects and so on.

In some embodiments, the area 104 may further include a control 105 for closing the area 104.

In some embodiments, the area 104 can also be closed in other ways, for example, when Application 1 receives a trigger action (such as a click action) for any other arbitrary position outside the area 104, Application 1 closes the area 104; Alternatively, the area 104 can be closed in the manner of countdown. If the display time of the area 104 meets a preset time, Application 1 will automatically close the area 104. The implementation manner of the closing area 104 is not limited in the present disclosure.

It should be understood that on the basis of the embodiment shown in FIG. 1I, after closing the area 104, Application 1 will jump to the user interface 18 shown in FIG. 1H.

In the actual scenario, the user can first display a sticker corresponding to the target information that wants to reply in the shooting page in conjunction with the manners of the above-mentioned embodiments shown in FIGS. 1B to 1I, and then shoot the image materials of video 0 in real time based on the shooting control 101 in the embodiment shown in FIG. 1A, or enter a material exhibition page through the material exhibition entry 106 in FIG. 1A to select the desired image materials.

After adding the sticker corresponding to the comment information that wants to reply and image materials, Application 1 can exemplarily display the editing page on the mobile phone, perform clipping through the editing page, and then publish the information related to video 0 and target information. In addition, a sticker for displaying the target information is contained in display of the play interface of video 0.

Among them, publishing the information related to the video 0 and the target information will be introduced in detail in the following embodiments.

Situation 2: The sticker corresponding to the target information is not added to the shooting page, and the sticker corresponding to the target information is added based on the entry label in the editing page In the situation 2, the image materials of video 0 are shot in real time based on the shooting control provided by the area 101 in the embodiment shown in FIG. 1A, or a material exhibition page is entered through the material exhibition entry 106 in FIG. 1A to select the desired image materials, altering the image materials are added, Application 1 can exemplarily display the editing page on the mobile phone.

That is, in the situation 2, the sticker corresponding to the target information is not added through the first entry label provided in the shooting page, or the sticker corresponding to the target information cannot be added because the first entry label is not provided in the shooting page.

Application 1 can exemplarily display the user interface 20 shown in FIG. 1J on the mobile phone, and with reference to FIG. 1J, the user interface 20 is used to display an editing page, which may include controls or entry labels related to clipping.

In FIG. 1J, the user interface 20 includes a third entry label 107 for entering a sticker page, and the implementation manner of the third entry label 107 is not limited in this disclosure. The implementation manner of the third entry label 107 is similar to that of the first entry label, and reference can be made to the detailed description of the first entry label in the previous embodiments, which will not be repeated here for brevity. For example, in FIG. 1H, the third entry label 107 represented by the text "sticker" is shown as an example.

When the third entry label 107 is exhibited in the form of text, it can also be exhibited by texts of other language types, which is not limited in this disclosure.

In addition, the user interface 20 may also include controls related to clipping, for example, a control for adding automatic subtitles, a control for entering a filter display page, a sound effects control, a control for adding text, a control for entering a music library, a control for adding subtitles, a recording control, etc.

Application 1 receives a trigger action (such as a click action) for the third entry label 107, and in response to the trigger action for the third entry label 1107, Application 1 exemplarily displays the user interface 121 as shown in FIG. 1K on the mobile phone.

In FIG. 1K, the user interface 21 includes an area 108, an area 109 and a control 110.

The area 108 includes entry labels for entering sub-sticker exhibition pages corresponding to different sticker types respectively. Referring to FIG. 1K, the area 108 includes a first sticker entry 1081 and a second sticker entry 1082. The first sticker entry 1081 is used to enter a sub-sticker exhibition page corresponding to a first sticker type in Application 1, and the second sticker entry 1082 is used to enter a sub-sticker display page corresponding to a second sticker type. Of course, the area 108 may also include entries for sub-sticker display pages corresponding to other sticker types, which are not exemplified here.

When Application 1 jumps to the user interface 21, an entry label corresponding to any sticker type included in the area 108 is located by default, and the sticker page corresponding to the default entry label is displayed in the area 109. For example, if in the user interface 21, the first sticker entry 1081 is located by default, a sub-sticker display page corresponding to the first sticker type will be displayed in the area 109.

The specific classification of the above sticker types is not limited in this disclosure.

Control 110 is used to exit the sticker page. Application 1 receives a trigger action (such as a click action) for the control 110, and Application 1 can jump to the user interface 20 shown in FIG. 1J. The control 110 can be implemented in the form of icon, text, digit, etc., and the implementation manner of the control 110 is not limited in this disclosure.

Continue to refer to FIG. 1K, the area 109 includes an entry label 1091.

The second entry label 1091 is used to enter an information exhibition page, and the specific implementation manner of the second entry label 1091 is not limited in this disclosure. For example, the entry label 1091 can be exhibited in the form of icon, text, symbol, picture, etc., or it can be exhibited in a manner of combining multiple forms. The display parameters adopted for the second entry label 1091, such as color, size, animation effect, etc., are not limited in the present disclosure. For example, as shown in FIG. 1K, the second entry label 1091 is exhibited in the form of sticker, and the sticker is in the shape of a message, and there exists a text "comment information" inside the pattern of the message shape, so that the user can clearly know from the user interface 21 which sticker is the entry label for entering the information exhibition page.

Of course, when the second entry label 1091 is displayed in the form of sticker, any other arbitrary shape can be adopted, such as right rectangle, rounded rectangle, irregular shape, etc. FIG. 1K is an example only.

The user interface 21 may also include entry labels for entering sub-sticker display pages corresponding to a plurality of sticker types, such as popular stickers, latest stickers, food stickers, text stickers and the like.

Application 1 receives a trigger action (such as a click action) for the second entry label 1091, and in response to the trigger action for the second entry label 1091, Application 1 can exemplarily display the user interface 22 as shown in FIG. 1L on the mobile phone.

Referring to FIG. 1L, the user interface 22 includes an area 111 for displaying an information exhibition page, wherein the area 111 is implemented in a manner similar to that of the implementation of the sticker display pages in FIGS. 1B to 1E in the previous embodiments, and can refer to the detailed description of the previous embodiments shown in FIGS. 1B to 1E, which will not be repeated here for brevity.

After that, based on a trigger action for a sticker corresponding to the target information in the information exhibition page shown in FIG. 1L, Application 1 can display the corresponding sticker in the editing page. This implementation manner is similar to the implementation manner of the sticker display pages in FIGS. 1F to 1I in the previous embodiments, and can refer to the detailed description of the previous embodiments shown in FIGS. 1F to 1I, which will not be repeated here for brevity.

In addition, continue to refer to the embodiment shown in FIG. 1J, the user interface 20 further includes a control 112 for entering a publication page, and the application 1 receives a trigger action (such as a click action) for the control 112, and in response to the trigger action for the control 112, the application 1 can exemplarily display the publication page on the mobile phone, wherein the specific implementation of the publication page for video 0 will be introduced later. After that, the information related to video 0 and target information can be published. In addition, a sticker for displaying the target information is contained in display of the playing interface of video 0.

Among them, publication of the information related to the video 0 and the target information will be introduced in detail in the following embodiments.

It should be noted that before entering the publication page through the control 112, the sticker corresponding to the target information to be replied to has been added in the editing page.

Situation 3: A sticker corresponding to the target information has been added to the shooting page, and the sticker corresponding to the target information is added again based on the entry label provided by the editing page.

In the situation 3, one or more stickers corresponding to the target information have been added to the shooting page. For example, in the embodiment shown in FIG. 1G, the sticker 1 corresponding to the comment information 1 has been added to the shooting page through the first entry label provided by the shooting page; on this basis, after Application 1 jumps to the editing page, the sticker 1 corresponding to the comment information 1 will be displayed in the editing page. Then, more stickers corresponding to comment information can be added based on the entry labels provided by the editing page, or the sticker 1 corresponding to the comment information 1 displayed in the current editing page can be adjusted.

In the embodiment shown in FIG. 1H, the sticker 1 corresponding to the comment information 1 and the sticker 2 corresponding to the comment information 2 have been added to the shooting page through the first entry label provided by the shooting page. On this basis, after Application 1 jumps to the editing page, sticker 1 corresponding to comment information 1 and sticker 2 corresponding to comment information 2 both will be displayed in the editing page. Then, more stickers corresponding to comment information can be added based on the entry labels provided by the editing page, or sticker 1 corresponding to comment information 1 and/or sticker 2 corresponding to comment information 2 displayed in the current editing page can be adjusted.

On the basis of the embodiment shown in FIG. 1H, Application 1 exits the information exhibition page and enters the editing interface, for example, the application 1 can exemplarily display the user interface 23 shown in FIG. 1M on the mobile phone, and with reference to FIG. 1M, the user interface 23 is used to display the editing page, which may include controls or entries related to clipping.

Compared with the user interface 20 shown in FIG. 1J, in the user interface 23 shown in FIG. 1M, the editing page displayed in the user interface 23 includes the sticker 1 corresponding to the comment information 1 and the sticker 2 corresponding to the comment information 2 added by the user through the first entry label provided by the shooting page.

In addition, the user interface 23 may also include controls related to clipping, for example, a control for adding automatic subtitles, a control for entering a filter exhibition page, a sound effects control, a control for adding flower words, a control for entering a music library, etc.

On the basis of the embodiment shown in FIG. 1G, it is assumed that the sticker 1 corresponding to the comment information 1 has been added through the first entry label provided by the shooting page, and after jumping to the editing page, Application 1 can display the sticker 1 corresponding to the comment information 1 in the editing page.

Furthermore, based on the embodiment shown in FIG. 1G, since the number of stickers corresponding to comment information displayed in the editing page does not reach the maximum number of target information supported by Application 1 that can be replied to, after jumping to the editing page, it can enter the sticker page through the third entry label 107 in the editing page, and then enter the information exhibition page through the second entry label 1091 in the sticker page, so as to add more stickers corresponding to target information in the editing page, so as to reply to multiple target information through video 0. The specific implementation manner can refer to the detailed description for situation 2, which will not be repeated for brevity.

For example, if Application 1 supports replying to at most 2 comment information, and sticker 1 corresponding to comment information 1 and sticker 2 corresponding to comment information 2 are added in the implementation manner in situation 2, Application 1 can exemplarily display the user interface 23 shown in FIG. 1M on the mobile phone. It should be understood that the upper limit of the number of target information that can be replied to is not limited in the present disclosure.

In addition, after the stickers corresponding to comment information are added through the shooting page or editing page, Application 1 also supports the adjustment of parameters of the stickers, such as positions, directions, sizes and the like.

For example, on the basis of the embodiment shown in FIG. 1F, assuming that the position of the sticker 1 is a first preset position, and the application 1 receives a trigger action (such as a drag action) for the sticker 1, the sticker 1 is moved from the first preset position to a position indicated by the trigger action.

Furthermore, it is assumed that the sticker 1 is currently in the horizontal direction, and when the application 1 receives a trigger action (such as a rotation action) for the sticker 1, it moves the sticker 1 from the horizontal direction to an angle indicated by the trigger action, for example, rotating 45 degrees to the left or rotating 45 degrees to the right, etc.

Furthermore, it is assumed that the sticker 1 is currently of a first size, and when the application 1 receives a trigger action (such as a magnification action) for the sticker 1, it magnifies the sticker 1 from the first size to a second size indicated by the magnification action, for example, 1.5× magnification.

In addition, after the sticker corresponding to comment information has been added through the shooting page or the editing page, application 1 also supports deleting the sticker corresponding to the target information. For example, on the basis of the embodiment shown in FIG. 1F, and after exiting the information exhibition page, application 1 receives a trigger action (such as a long press action) for sticker 1 in the editing page, and in response to the trigger action, application 1 can exemplarily display the user interface 24 shown in FIG. 1N on the mobile phone, which includes a deletion control s1 corresponding to sticker 1. In the actual scenario, one or more associated other controls corresponding to sticker 1 can be displayed in user interface 24, without being not limited to deletion control s1. The functions, quantities, implementation manners and so on of controls associated with stickers are not limited in the present disclosure.

Application 1 receives the trigger action (such as click action) for the deletion control s1, and in response to the trigger action for the deletion control s1, Application 1 deletes the sticker 1 corresponding to the comment information 1 displayed in the shooting page, that is, application 1 can jump to the user interface 11 shown in FIG. 1A in response to the trigger action for the deletion control s1.

It should be noted that when a plurality of stickers corresponding to comment information have been added through the shooting page and stickers corresponding to comment information have been added through the editing page, the implementation manner of deleting the stickers corresponding to comment information can be similar to that in the above-mentioned FIG. 1N, which will not be repeated here for brevity. And after deleting some stickers corresponding to the target information, when the maximum number of target information supported by Application 1 is not exceeded, new stickers corresponding to the target information can be re-added, in a manner similar to that in the previous embodiment.

Continue to refer to the embodiment shown in FIG. 1M, the user interface 23 further includes a control 112, the application 1 receives a trigger action (such as a click action) for the control 112, and in response to the trigger action for the control 112, the application 1 can exemplarily display a publication page on the mobile phone.

The user interface 25 shown in FIG. 1O exemplarily shows a schematic diagram of a publication page.

In FIG. 1O, the user interface 25 is used to display the publication page. The specific implementation manner of the user interface 25 is not limited in the present disclosure.

In FIG. 1O, the user interface 25 may include an area 113 and a control 114.

The area 113 may include an area 1131, an area 1132 and an area 1133.

The area 1131 is used to display a link associated with the comment information 1, such as "Reply to+Reply ID+Account Nickname of the publisher of the comment information 1 (for example, user 3)" for displaying the link, and provide an input window for replying with text content, so that the text content replied by the user can be displayed in the input window.

The area 1132 is used to exhibit the cover of the generated first multimedia content (i.e., video 0), such as showing thumbnails for a certain frame of playing picture of the first multimedia content and stickers displayed on the aforementioned shooting page or editing page in the form of cards, and providing a function of selecting the cover of the first multimedia content.

It should be noted that if the user interface 17 in the embodiment shown in FIG. 1J jumps to the publication page, in the area 1132, thumbnails for a certain frame of playing picture of the first multimedia content and the sticker 1 are displayed, and the function of selecting the cover of the first multimedia content is provided. If the embodiment shown in FIG. 1M jumps to the publication page, in the area 1132, thumbnails for a certain frame of playing picture of the first multimedia content as well as sticker 1 and sticker 2 are displayed, and the function of selecting the cover of the first multimedia content is provided. The user interface 25 shown in FIG. 1O is exemplified based on the embodiment shown in FIG. 1J.

The area 1133 is used to provide an entry for selecting the topic to which the first multimedia content belongs, so that the topic to which the first multimedia content belongs can be displayed in the area 1131, and to provide an entry for selecting a specific user, so as to conveniently remind the specific user to watch the first multimedia content.

The control 114 is used to publish the information related to the first multimedia content, that is, the application 1 can send at least the first multimedia content and the link associated with the comment information 1 to a server device, and can also send display parameters related to the sticker 1 and the text content replied by the user through the input window to the server device.

It should be noted that in addition to the area 113 and the control 114, the user interface 25 can also provide various entries, such as the user's right to view the first multimedia content, the right to comment on the first multimedia content, the right to edit the first multimedia content, the right to save the first multimedia content in the application 1, the right to share the first multimedia content and the right to store the first multimedia content in the draft box, and so on, which are not limited in this disclosure.

Application 1 receives a trigger action (such as a click action) for the control 114, and Application 1 can send the information related to the first multimedia content to the server device.

Therefore, after the application 1 receives the information related to the first multimedia content from the server device, the application 1 can display the user interface 26 exemplarily shown in FIG. 1P on the mobile phone for displaying the first multimedia content. The specific implementation manner of the user interface 26 is not limited in the present disclosure.

Specifically, after receiving the user's reply to the comment information 1 in the form of multimedia, the application 1 can acquire the first multimedia content and display the sticker 1 containing the comment information 1 on the playing interface of the first multimedia content.

In FIG. 1P, the user interface 26 includes an area 115 and an area 116.

The area 115 is used to display the sticker 1 containing the comment information 1, and the area 115 can also provide an entry for replying to the comment information 1 in the form of multimedia. In addition, the area 115 can also be used to provide an entry for viewing/collecting the comment information 1 and/or information related to the comment information 1. The specific implementation manner of the area 115 is not limited in the present disclosure.

For example, when the application 1 receives a trigger action (such as a long press action) for the area 115, the application 1 may display, in the area close to the sticker 1, one or more controls associated with the sticker 1 (i.e., comment information 1), such as a view control, a deletion control, a collection control, a reply entry for entering the shooting page, etc.

It should be noted that the area 115 provides an entry for replying to the comment information 1 in the form of multimedia, which is convenient for the user who publishes the multimedia content to reply to the comment information 1 in the form of multimedia again, and the user associated with the comment information 1 can also reply to the comment information 1 based on the entry provided by the area 115 for replying to the comment information 1 in the form of multimedia, which enriches the reply channels and is beneficial for users to publish multimedia content.

The area 116 is used to display the publisher of video 0 (that is, user 1). For example, "@+nickname of user 1's account" can be used to exhibit the publisher of video 0. In this disclosure, the nickname of user 1's account is "aaa" as an example. In addition, after receiving the user's trigger action such as clicking for the area 116, the application 1 can jump to the account page of the user 1 from the user interface 26.

In addition, in FIG. 1P, the user interface 26 may further include an area 117 and a control 118.

The area 117 is used to display a link associated with the comment information 1, which is used to trigger the display of the comment information 1. The manner of displaying this link is not limited in this disclosure. In some embodiments, the link can be exhibited by, for example, "Reply to+Reply ID+Account nickname of the publisher of comment information 1 (i.e. user 3)". Among them, the Reply ID can be represented in the form of icon, symbol, text, picture, etc. In addition, the specific implementation manner of displaying the comment information 1 after the link is triggered is not limited in the present disclosure.

In addition, the area 117 can also be used to display the text content replied by the user when the user replies to the comment information 1 in the form of multimedia.

The control 118 is used to trigger the display of the comment area in the playing interface of video 0. Among them, the comment area in the playing interface of video 2 is used to display the information about commenting on, replying to or asking questions to video 0, etc., which can be in the form of text, symbol, picture, animation, etc. Among them, the user can comment on, reply to or ask questions to the following which includes, not limited to, the playing interface of the video 0, sticker 1 displayed on the playing interface of video 0, comment information 1, information in the comment area in the playing interface of video 0, etc.

After the server device obtains the information related to video 0 about the user replying to comment information 1 from application 1, the server device can send a notification message a to a client associated with comment information 1.

Among them, the client associated with the comment information 1 include, but not limited to, a client that publishes the comment information 1, a client that "likes" the comment information 1, the client that comments on/replies to/questions about the comment information 1, a client that publishes the video 1 corresponding to the comment information 1, a client that "likes" the video 1 corresponding to the comment information 1, a client that comments on/replies to the video 1 corresponding to the comment information 1, the client specified by the user 1 in the publication page, etc.

The above notification message a is used to notify the above client associated with the comment information 1 that the user 1 has replied to the comment information 1 through the video 0. The specific implementation manner of the notification message a and the display manner at the client are not limited in the present disclosure.

Taking the publisher of video 1 (that is, user 2) as an example, after Application 1 receives the notification message a from the server device, Application 1 can display the user interface 27 exemplarily shown in FIG. 1Q on the mobile phone of the publisher of video 1.

Among them, the user interface 27 is used to display the notification page in the application 1, and the notification page is used to display various types of notification messages indicating such as receiving information, collecting, "liking" and commenting. The specific implementation manners of the notification page and the user interface 27 are not limited in the present disclosure.

In FIG. 1Q, the user interface 27 may include an area 119 for displaying the notification message a in the notification page, if the notification message a indicates that the user 1 authored the video 0 to reply to the comment information 1, the notification message a may be exhibited in a form such as "avatar of user 1' s account, nickname of user 1' s account, identifier of replied text, reply time point and notification card", etc. Among them, the notification card may include a thumbnail composed of both a certain frame of playing picture of the first multimedia content and the sticker 1, and the sticker 1 may be displayed in suspension over the playing picture.

To sum up, Application 1 can also send a notification message a to the client associated with the comment information 1 through the server, so that a relevant user can timely know that a user (that is, user 1) has replied to the comment information 1 in the form of multimedia.

The user interface 27 may also include a control for a user to enter a homepage of Application 1, a search control, a control to enter a shooting page, a control to enter the notification page, controls to enter a personal account page, and so on, which will not be explained one by one.

In addition, on the basis of the above-mentioned situations 1 to 3, in some cases, there may be no information that can be displayed in the information exhibition page, for example, Application 1 may not collect any comment information, do not have any invited-to-answer information, etc. Therefore, after entering the information exhibition page based on the first entry label 102 of the shooting page or the second entry label 1091 of the editing page, Application 1 may exemplarily display the user interface 28 shown in FIG. 1R on the mobile phone.

In FIG. 1R, the user interface 28 includes an area 120 for displaying an information exhibition page. Since there is no display information in the information exhibition page, a prompt information can be displayed in the area 120, the prompt information is used to prompt the user to collect the comment information by long-pressing the comment information, the collected comments will be displayed in the area 120, and then the collected comments can be replied to.

For example, as shown in FIG. 1R, the area 120 includes an area 1201, an area 1202 and a control 1203; wherein the area 1201 is similar to the area 1031 in the area 103 whose detailed description can be referred to; the control 1203 is similar to control 1033 whose detailed description can be referred to.

The area 1202 is used to display a prompt information, and the implementation manner of the prompt information is not limited in the disclosure. The prompt information can be exhibited in a manner of combining icon and text. For example, in FIG. 1P, in the center of the area 1202, a corresponding icon, a text content "long press to collect the comment information, the collected comment information will be displayed here, and then you can reply to these comment information" and a text content "reply to your collected comment information" can be displayed, and such two text contents adopt different font sizes and weights.

It should be noted that the embodiments shown in FIGS. 1A to 1R are only examples of the information reply methods provided by this disclosure. In actual scenarios, the layout of some pages, display parameters, and the implementation manners of controls and entries can be flexibly set according to requirements.

Based on the foregoing description, the following embodiments of this disclosure take application programs as examples, and explain the information reply method according to this disclosure in detail in conjunction with the drawings and application scenarios.

Figure 2A:
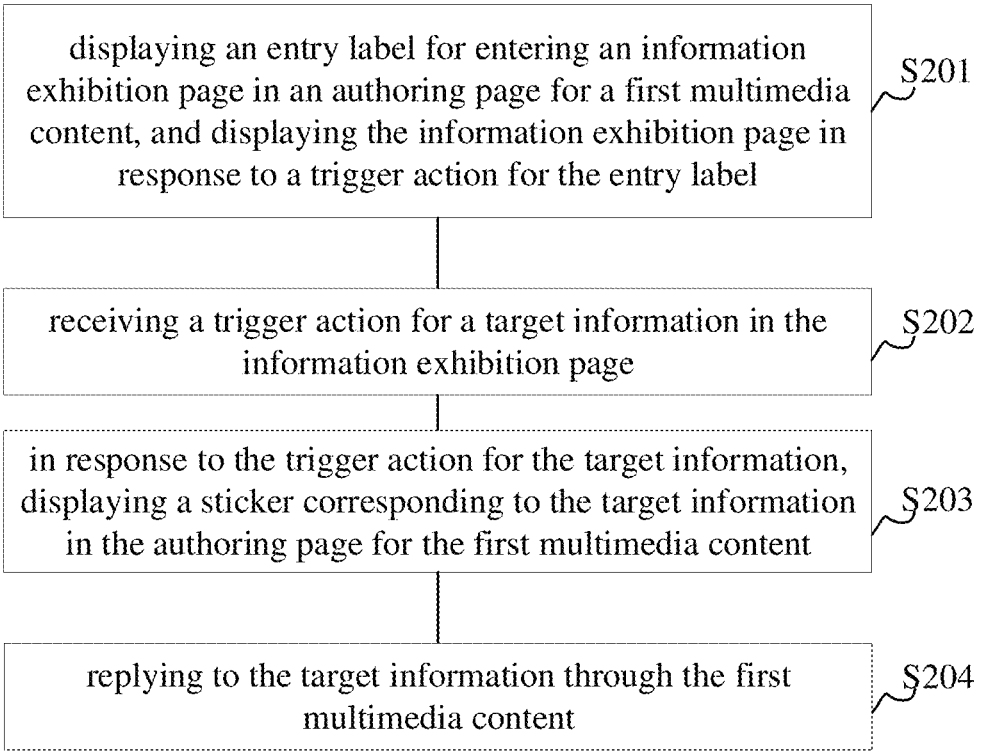
FIGS. 2A to 2D are flowcharts of an information reply method according to embodiments of the disclosure.

Referring to FIG. 2A, which is a flow diagram of an information reply method according to an embodiment of the present disclosure. As shown in FIG. 2A, the information reply method provided by this disclosure may include:

S201, displaying an entry label for entering an information exhibition page in an authoring page for a first multimedia content, and displaying the information exhibition page in response to a trigger action for the entry label.

In conjunction with the foregoing embodiments, it can be known that the authoring page can include a shooting page and/or an editing page. In one possible implementation, a corresponding entry label can be set in the shooting page and/or the editing page, and the information exhibition page can be entered through the entry label. Among them, the entry label can be set only in the shooting page, or only in the editing page, or in both the shooting page and the editing page.

Figure 2B:
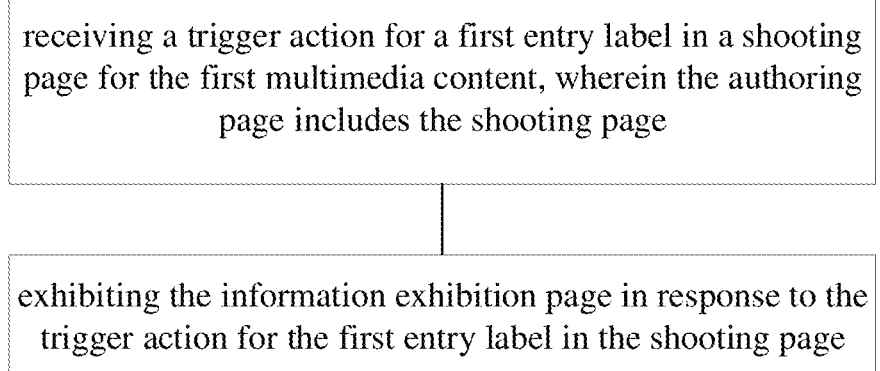

In one possible implementation, Application 1 receives a trigger action (such as click action) for the first entry label in the shooting page, and Application 1 displays the information exhibition page on the electronic device, as exemplarily shown in FIG. 2B.

Figure 2C:
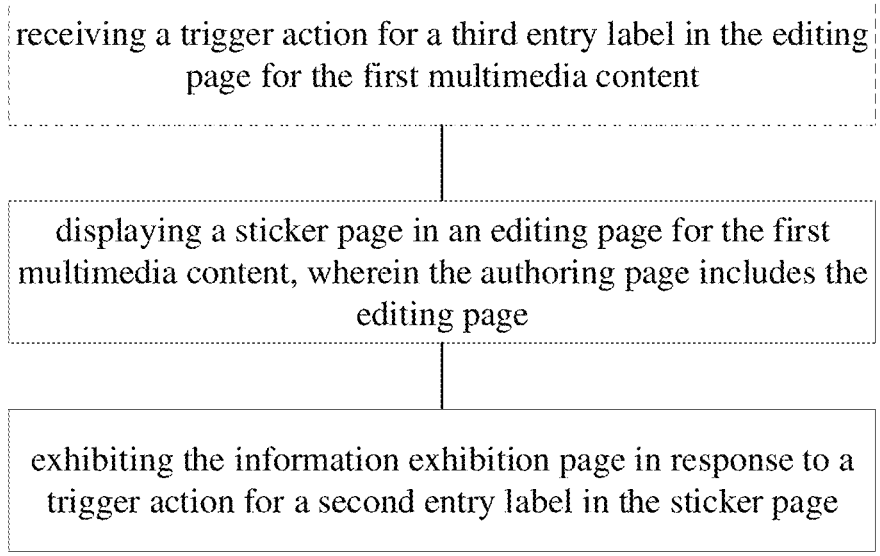

According to some embodiments, the information exhibition page can be exhibited in response to a trigger action for a second entry label in a sticker page, which is displayed in an editing page for the first multimedia content, wherein the authoring page includes the editing page. In another possible implementation, the application 1 receives a trigger action (such as a click action) for a third entry label in the editing page, and Application 1 displays a sticker page on the electronic device, wherein the sticker page includes a second entry label for entering the information exhibition page; Application 1 receives a trigger action (such as click action) for the second entry label, and Application 1 displays the information exhibition page on the electronic device, as exemplarily shown in FIG. 2C. Note that the usage of the third entry label is optional, as indicated by dotted line.

To sum up, the information exhibition page can be directly or indirectly entered based on the entry labels; for example, the information exhibition page can be directly entered through the first entry label 102 in the shooting page in the embodiment shown in FIG. 1A, that is, the first entry label 102 is the first entry label in the above-mentioned embodiment; For another example, the sticker page is first entered through the third entry label 107 in the editing page in the embodiment shown in FIG. 1I, and then the information exhibition page is entered based on the second entry label 1091 in the sticker page, such manner can be interpreted as indirectly entering the information exhibition page, wherein the third entry label 107 is the third entry label in the above embodiment, and the second entry label 1091 is the second entry label in the above embodiment.

Among them, the information exhibition page includes one or more pieces of information, and the information in the information exhibition page includes respective information obtained by commenting on or replying to through one or more second multimedia contents. The specific implementation manner of the information exhibition page is not limited in the present disclosure. Among them, the information in the information exhibition page can include one or more types of information, such as collected comment information, collected reply information, question information about invitation to answer, question information for recommending answers, etc. How to determine each information displayed in the information exhibition page is not limited in the present disclosure.

In addition, the information exhibition page can be exhibited in the manner of the embodiment shown in FIG. 1B or FIG. 1C, for example, in the information exhibition page, the sticker area corresponding to each piece of information can have the same width, and such areas can be displayed in two columns aligned up and down. Of course, more columns can be displayed. For details, please refer to the detailed description of the embodiments shown in FIGS. 1B to 1C.

Alternatively, the information exhibition page can display different types of information in different sub-exhibition pages in the manner shown in FIG. 1E or FIG. 1F, and the information exhibition page is provided with entry labels for entering the sub-exhibition pages corresponding to different types of information, and in each sub-exhibition page, the sticker area corresponding to each piece of information can have the same width, and such areas can be displayed in two columns aligned up and down, of course, more columns can be displayed. For details, please refer to the detailed description of the embodiments shown in FIGS. 1E to 1F.

The first multimedia content is used to reply to the target information in the information exhibition page in the form of multimedia. The first multimedia content includes, but is not limited to, audio and/or video, wherein the image materials of the first multimedia content may include audio and/or video that has been shot or recorded in an electronic device (i.e., audio and/or video stored in a storage module of the electronic device); alternatively, the image materials of the first multimedia content may also include videos/photos taken in real time when the first multimedia content is being authored. The parameters of the first multimedia content, such as duration, aspect ratio, sound effect, etc., are not limited in the present disclosure.

S202, receiving a trigger action for the target information in the information exhibition page.

S203, in response to the trigger action for the target information, a sticker corresponding to the target information is displayed in the authoring page for the first multimedia content.

The target information may include one or more pieces of information displayed in the information exhibition page, and the target information is the information that the user wants to reply in the form of multimedia. In conjunction with the embodiments shown in FIG. 1D to FIG. 1O, these stickers 1 (or stickers 1 and stickers 2) displayed in the shooting page and/or editing page are stickers corresponding to the target information.

In response to the trigger action for the sticker corresponding to the target information in the information exhibition page, Application 1 can display the sticker corresponding to the target information in the authoring page (i.e., the shooting page and/or the editing page), thereby associating the target information with the authored first multimedia content.

In this scheme, the sticker corresponding to the target information can be added only through the first entry label provided by the shooting page, or a sticker page can be entered only through the third entry label provided by the editing page, and then the sticker corresponding to the target information can be added through the second entry label provided by the sticker page, or the stickers corresponding to the target information can also be added through the entry labels provided by the shooting page and the editing page respectively. The specific implementation can refer to the detailed description of embodiments shown in the above-mentioned situations 1 to 3 respectively, which will be not repeated here for brevity.

S204, replying to the target information through the first multimedia content.

Figure 2D:
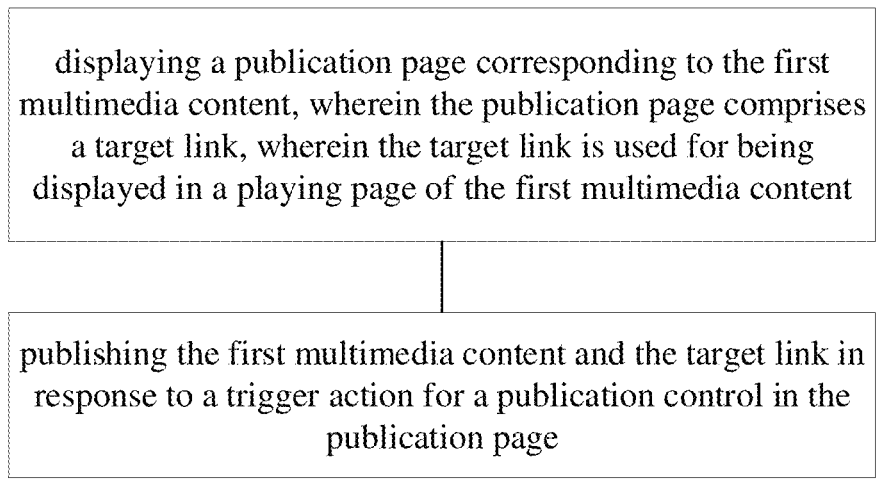

The operation in step S204 can be implemented in a variety of manners. According to some embodiments, as shown in FIG. 2D, a publication page corresponding to the first multimedia content is displayed, wherein the publication page comprises a target link, wherein the target link is used for being displayed in a playing page of the first multimedia content, and then the first multimedia content and the target link are published in response to a trigger action for a publication control in the publication page. According to some embodiments, the first multimedia content and the target information are sent to a server device, so that the server device sends a notification message to a client associated with the target information; wherein the notification message is used to notify the associated client that the first multimedia content has been used to reply to the target information.

In some embodiments, by adding the sticker corresponding to the target information, the first multimedia content can be bound with the target information, after the authoring, the first multimedia content, information related to the first multimedia content and information related to the target information can be published through publication controls provided by the publication page.

Among them, the information related to the first multimedia content can include information about cover of the first multimedia content, information about topic to which the first multimedia content belongs, information specifying a client to be reminded, and so on, the information related to the target information can include a link corresponding to the target information, text contents of replying to target information, display parameters of the target information, and so on.

On one hand, Application 1 sends the first multimedia content, the information related to the first multimedia content and the information related to the target information to the server device, so that the server device can send a notification message to a client related to the target information. Among them, the client related to the target information can include: a client that publishes the target information, a client that "likes" the target information, a client that comments on/replies to/asks questions about the target information, a client that publishes a second multimedia content corresponding to the target information, a client that "likes" the second multimedia content corresponding to the target information, and a client that comments on/replies to the second multimedia content corresponding to the target information.

The server device can send the notification message through one or more clients related to the target information, and the notification message is displayed in the notification page of the clients related to the target information, wherein the notification page is exemplarily shown in FIG. 1Q, and of course, the notification page can be implemented in other ways, and the specific implementation manner of the notification page is not limited in the present disclosure.

On the other hand, Application 1 can also obtain the published first multimedia content and play the first multimedia content on an electronic device, and a playing page of the first multimedia content includes a sticker corresponding to the target information. Application 1 can also display, in the playing page of the first multimedia content, other information associated with the first multimedia content, such as a publisher of the first multimedia content, a link associated with the target information for triggering display of the target information, the text content replied by the publisher of the first multimedia content when the publisher replies to the target information in the form of multimedia, and so on.

In conjunction with the foregoing embodiments, the first multimedia content can be used to reply to multiple pieces of target information, therefore, stickers corresponding to multiple pieces of target information respectively can all be displayed in the playing page of the first multimedia content, and the information related to each piece of target information can be displayed in the playing page of the first multimedia content in a preset way, for example, according to chronological order of adding target information pairs, the information related to target information can be arranged and displayed in order from top to bottom. The specific implementation manner can refer to the detailed description of the embodiment shown in FIG. 1P, which will not be repeated here for brevity.

According to the method provided by this embodiment, the entry label for the information exhibition page is provided in the authoring page for the first multimedia content, the information exhibition page can be entered based on the entry label, and the target information that wants to be replied can be selected from the information exhibition page, thereby reducing the complexity of user operation; then, the target information is displayed in the authoring page for the first multimedia content in the form of sticker, so as to bind the authored first multimedia content with the target information, and realize replying to the target information in the form of multimedia, which not only enriches the reply manners, enhances the interest of users in replying to the target information, but also improves the probability of users authoring and publishing the multimedia content.

Figure 3:
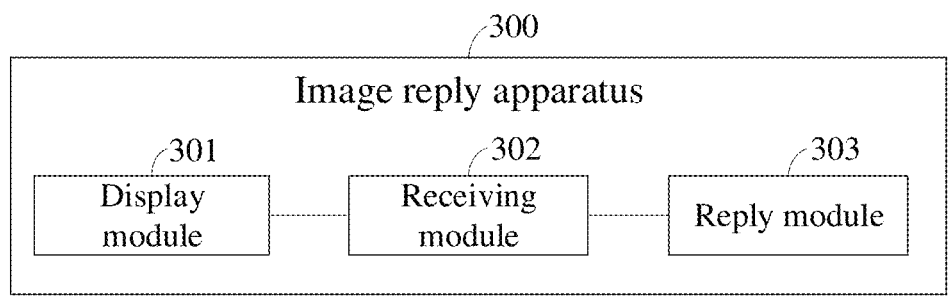
FIG. 3 is a structural diagram of an information reply apparatus according to an embodiment of the disclosure.

FIG. 3 is a structural schematic diagram of an information reply apparatus according to an embodiment of the disclosure. Referring to FIG. 3, the information reply apparatus 300 according to this embodiment comprises:

a display module 301, configured to display an entry label for entering an information exhibition page in an authoring page for a first multimedia content, and display the information exhibition page in response to a trigger action for the entry label, wherein the information exhibition page comprises one or more pieces of information including information obtained by replying to respective corresponding second multimedia content.

a receiving module 302, configured to receive a trigger action for a target information in the information exhibition page.

the display module 301 is further configured to in response to the trigger action for the target information, display a sticker corresponding to the target information in the authoring page for the first multimedia content.

a reply module, 303, configured to reply the target information through the first multimedia content.

In some possible embodiments, the receiving module 302 is further configured to receive a trigger action for a first entry label in the shooting page for the first multimedia content, and the authoring page includes the shooting page; the display module 301 is specifically configured to display the information exhibition page in response to the trigger action for the first entry label in the shooting page.

In some possible embodiments, the display module 301 is further configured to display a sticker page in the editing page of the first multimedia content, and the authoring page includes the editing page; the receiving module 302 is further configured to receive a trigger action for a second entry label in the sticker page; a display module 301 is specifically configured to exhibit the information exhibition page in response to the trigger action for the second entry label in the sticker page.

In some possible embodiments, the receiving module 302 is further configured to receive a trigger action for a third entry label in the editing page of the first multimedia content; the display module 301 is further configured to display the sticker page in the editing page in response to the trigger action for the third entry label in the editing page, wherein the sticker page includes the second entry label, and the second entry label is used to enter the information exhibition page.

In some possible embodiments, in the information exhibition page, the width of the area corresponding to each piece of information is the same, and the one or more pieces of information are displayed in two columns.

In some possible embodiments, the receiving module 302 is further configured to receive trigger actions corresponding to multiple target information in the information exhibition page respectively.

The display module 301 is specifically configured to display the first stickers corresponding to the plurality of target information respectively in the authoring page for the first multimedia content, in response to the trigger actions corresponding to the plurality of target information respectively.

In some possible embodiments, the display module 301 is specifically used to display a publication page corresponding to the first multimedia content, and the publication page includes a target link, wherein the target link is used to be displayed in the playing page of the first multimedia content.

The reply module 303 is further configured to publish the first multimedia content and the target link in response to the trigger action for the publication control in the publish page.

In some possible embodiments, the reply module 303 is specifically used to send the first multimedia content and the target information to the server device, so that the server device can send a notification message to a client associated with the target information; the notification message is used to notify the associated client that the target information has been replied to with the first multimedia content.

The information reply apparatus according to this embodiment can be used to implement the technical solution of any of the above-mentioned method embodiments, and their implementation principle and technical effect are similar, so please refer to the detailed description of the above-mentioned method embodiments, which will not be repeated here for brevity.

Figure 4:
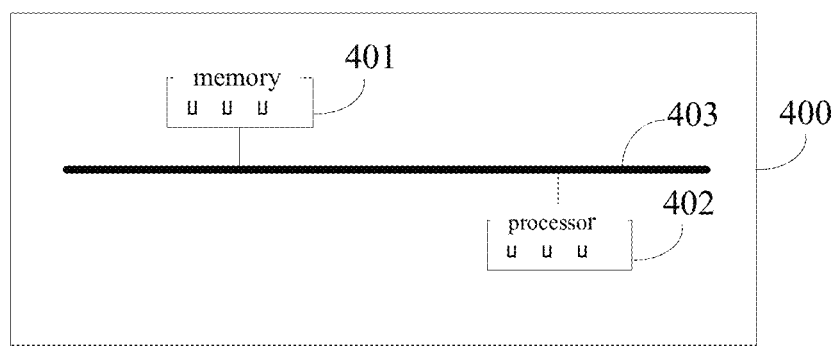
FIG. 4 is a structural diagram of an information reply apparatus according to an embodiment of the disclosure.

FIG. 4 is a structural diagram of an electronic device provided by an embodiment of the disclosure. Referring to FIG. 4, the electronic device 400 provided by this embodiment includes a memory 401 and a processor 402.

The memory 401 can be a separate physical unit, and can be connected with the processor 402 through the bus 403. The memory 401 and the processor 402 can also be integrated together and implemented by hardware.

The memory 401 is used to store program instructions, and the processor 402 calls the program instructions to perform the operations of any of the above method embodiments.

Optionally, when part or all of the methods of the above embodiments are implemented by software, the above electronic device 400 may only include the processor 402. The memory 401 for storing programs is located outside the electronic device 400, and the processor 402 is connected to the memory through a circuit/wire for reading and executing the programs stored in the memory.

The processor 402 may be a central processing unit (CPU), a network processor (NP) or a combination of CPU and NP.

The processor 402 may further include a hardware chip. The above-mentioned hardware chip can be an application-specific integrated circuit (ASIC), a programmable logic device (PLD) or a combination thereof. The PLD can be a complex programmable logic device (CPLD), a field-programmable gate array (FPGA), a generic array logic (GAL) or any combination thereof.

The memory 401 may include volatile memory, such as random-access memory (RAM); The memory may also include non-volatile memory, such as flash memory, hard disk drive (HDD) or solid-state drive (SSD); The memory may also include a combination of the above-mentioned kinds of memories.

The disclosure also provides a computer-readable storage medium (also called as a readable storage medium) including computer program instructions, which, when executed by at least one processor of the electronic device, can implement the technical solution of any of the above method embodiments.

The disclosure also provides a program product including computer program instructions stored in a readable storage medium, from which at least one processor of the electronic device can read the computer program instructions, and the at least one processor executes the computer program instructions to cause the electronic device to execute the technical solution as in any method embodiment.

It should be noted that in this paper, relational terms such as "first" and "second" are only used to distinguish one entity or operation from another entity or operation, and do not necessarily require or imply any actual relationship or order between these entities or operations. Furthermore, the terms "include", "including" or any other variant thereof are intended to cover non-exclusive inclusion, so that a process, method, article or equipment that includes a series of elements includes not only those elements, but also other elements not explicitly listed, or elements inherent to such process, method, article or equipment. Without further limitation, the element defined by the sentence "including a" does not exclude that there are other identical elements in the process, method, article or equipment including the element.

What has been described above is only a specific embodiment of the present disclosure, so that those skilled in the art can understand or realize the present disclosure. Many modifications to these embodiments will be obvious to those skilled in the art, and the general principles defined herein can be implemented in other embodiments without departing from the spirit or scope of this disclosure. Therefore, the present disclosure will not be limited to the embodiments described herein, but is to be accorded the widest scope consistent with the principles and novel features disclosed herein.

What is claimed is:

1. An information reply method, comprising:
   displaying an entry label for entering an information exhibition page in an authoring page for a first multimedia content, wherein the authoring page includes at least one of a shooting page and an editing page;
   displaying the information exhibition page in response to a trigger action for the entry label, wherein the information exhibition page comprises one or more pieces of information including information obtained by replying to respective corresponding second multimedia content;
   receiving trigger actions for a plurality of target information in the information exhibition page respectively, wherein the target information is information included in the one or more pieces of information corresponding to the trigger operation performed by a user;
   in response to the trigger actions for the plurality of target information, displaying plurality of target information as stickers respectively in the authoring page for the first multimedia content, so that the authored multimedia content is bound with the stickers, wherein the sticker at least includes text content and user information corresponding to the target information; and after the authoring, replying to the plurality of target information through the first multimedia content concurrently, wherein the replying to the plurality of target information through the first multimedia content concurrently comprises replying to the plurality of target information in form of multimedia based on the authored multimedia contents bound with the stickers;

wherein the replying attaches the first multimedia to each of the plurality of target information separately.

2. The method of claim 1, wherein, the displaying an entry label for entering an information exhibition page in an authoring page for a first multimedia content, and displaying the information exhibition page in response to a trigger action for the entry label, comprises:

receiving a trigger action for a first entry label in the shooting page for the first multimedia content;

exhibiting the information exhibition page in response to the trigger action for the first entry label in the shooting page.

3. The method of claim 1, wherein, the displaying an entry label for entering an information exhibition page in an authoring page for a first multimedia content, and displaying the information exhibition page in response to a trigger action for the entry label, comprises:

displaying the sticker page in an editing page for the first multimedia content;

exhibiting the information exhibition page in response to a trigger action for a second entry label in the sticker page.

4. The method of claim 3, wherein, the displaying the sticker page in the editing page for the first multimedia content, comprises:

receiving a trigger action for a third entry label in the editing page for the first multimedia content;

exhibiting the sticker page in the editing page in response to the trigger action for the third entry label in the editing page, wherein the sticker page includes the second entry label, and the second entry label is used for entering the information exhibition page.

5. The method of claim 1, wherein, in the information exhibition page, each area corresponding to each information has the same width, and the one or more information are displayed in two columns.

6. The method of claim 1, wherein, the replying to the target information through the first multimedia content, comprises:

displaying a publication page corresponding to the first multimedia content, wherein the publication page comprises a target link, wherein the target link is used for being displayed in a playing page of the first multimedia content;

publishing the first multimedia content and the target link in response to a trigger action for a publication control in the publication page.

7. The method of claim 1, wherein, the replying to the target information through the first multimedia content further comprises:

sending the first multimedia content and the target information to a server device, so that the server device sends a notification message to a client associated with the target information; wherein the notification message is used to notify the associated client that the first multimedia content has been used to reply to the target information.

8. An electronic device, comprising:

a memory, configured to store computer program instructions; and a processor, wherein the computer program instructions, when executed by the processor, cause the electronic device to:

display an entry label for entering an information exhibition page in an authoring page for a first multimedia content, wherein the authoring page includes at least one of a shooting page and an editing page, display the information exhibition page in response to a trigger action for the entry label, wherein the information exhibition page comprises one or more pieces of information including information obtained by replying to respective corresponding second multimedia content;

receive trigger actions for a plurality of target information in the information exhibition page respectively, wherein the target information is information included in the one or more pieces of information corresponding to the trigger operation performed by a user;

in response to the trigger actions for the plurality of target information, display the plurality of target information as stickers respectively in the authoring page for the first multimedia content, so that the authored multimedia content is bound with the stickers, wherein the sticker at least includes text content and user information corresponding to the target information; and after the authoring, reply to the plurality of target information through the first multimedia content concurrently, wherein the computer program instructions, when executed by the processor, cause the electronic device to reply to the plurality of target information through the first multimedia content concurrently by replying to the plurality of target information in form of multimedia based on the authored multimedia contents bound with the stickers;

wherein the replying attaches the first multimedia to each of the plurality of target information separately.

9. The electronic device of claim 8, wherein the computer program instructions, when executed by the processor, cause the electronic device to display an entry label for entering an information exhibition page in an authoring page for a first multimedia content, and displaying the information exhibition page in response to a trigger action for the entry label, by:

receiving a trigger action for a first entry label in the shooting page for the first multimedia content, and exhibiting the information exhibition page in response to the trigger action for the first entry label in the shooting page, and/or displaying a sticker page in the editing page for the first multimedia content, and exhibiting the information exhibition page in response to a trigger action for a second entry label in the sticker page.

10. The electronic device of claim 9, wherein the computer program instructions, when executed by the processor, cause the electronic device to display the sticker page in the editing page for the first multimedia content, by:

receiving a trigger action for a third entry label in the editing page for the first multimedia content; and exhibiting the sticker page in the editing page in response to the trigger action for the third entry label in the editing page, wherein the sticker page includes the second entry label, and the second entry label is used for entering the information exhibition page.

11. The electronic device of claim 8, wherein, in the information exhibition page, each area corresponding to each information has the same width, and the one or more information are displayed in two columns.

12. The electronic device of claim 8, wherein the computer program instructions, when executed by the processor, cause the electronic device to reply to the target information through the first multimedia content, by:
- displaying a publication page corresponding to the first multimedia content, wherein the publication page comprises a target link, wherein the target link is used for being displayed in a playing page of the first multimedia content, and publishing the first multimedia content and the target link in response to a trigger action for a publication control in the publication page, and/or
- sending the first multimedia content and the target information to a server device, so that the server device sends a notification message to a client associated with the target information; wherein the notification message is used to notify the associated client that the first multimedia content has been used to reply to the target information.

13. A readable storage medium storing computer program instructions thereon, which when running on an electronic device, cause the electronic device to
- display an entry label for entering an information exhibition page in an authoring page for a first multimedia content, wherein the authoring page includes at least one of a shooting page and an editing page,
- display the information exhibition page in response to a trigger action for the entry label, wherein the information exhibition page comprises one or more pieces of information including information obtained by replying to respective corresponding second multimedia content;
- receive trigger actions for a plurality of target information in the information exhibition page respectively, wherein the target information is information included in the one or more pieces of information corresponding to the trigger operation performed by a user;
- in response to the trigger actions for the plurality of target information, display the plurality of target information as stickers respectively in the authoring page for the first multimedia content, so that the authored multimedia content is bound with the stickers, wherein the sticker at least includes text content and user information corresponding to the target information; and
- after the authoring, reply to the plurality of target information through the first multimedia content concurrently, wherein the computer program instructions, which when running on an electronic device, cause the electronic device to reply to the plurality of target information through the first multimedia content concurrently by replying to the plurality of target information in form of multimedia based on the authored multimedia contents bound with the stickers;

wherein the replying attaches the first multimedia to each of the plurality of target information separately.

14. The readable storage medium of claim 13, wherein the computer program instructions, when running on the electronic device, cause the electronic device to display an entry label for entering an information exhibition page in an authoring page for a first multimedia content, and displaying the information exhibition page in response to a trigger action for the entry label, by:
- receiving a trigger action for a first entry label in the shooting page for the first multimedia content, and exhibiting the information exhibition page in response to the trigger action for the first entry label in the shooting page, and/or
- displaying a sticker page in the editing page for the first multimedia content, and exhibiting the information exhibition page in response to a trigger action for a second entry label in the sticker page.

15. The readable storage medium of claim 14, wherein the computer program instructions, when running on the electronic device, cause the electronic device to display the sticker page in the editing page for the first multimedia content, by:
- receiving a trigger action for a third entry label in the editing page for the first multimedia content; and
- exhibiting the sticker page in the editing page in response to the trigger action for the third entry label in the editing page, wherein the sticker page includes the second entry label, and the second entry label is used for entering the information exhibition page.

16. The readable storage medium of claim 13, wherein, in the information exhibition page, each area corresponding to each information has the same width, and the one or more information are displayed in two columns.

17. The readable storage medium of claim 13, wherein the computer program instructions, when running on the electronic device, cause the electronic device to reply to the target information through the first multimedia content, by:
- displaying a publication page corresponding to the first multimedia content, wherein the publication page comprises a target link, wherein the target link is used for being displayed in a playing page of the first multimedia content, and publishing the first multimedia content and the target link in response to a trigger action for a publication control in the publication page, and/or
- sending the first multimedia content and the target information to a server device, so that the server device sends a notification message to a client associated with the target information; wherein the notification message is used to notify the associated client that the first multimedia content has been used to reply to the target information.

* * * * *